(12) United States Patent
Krugman et al.

(10) Patent No.: US 10,807,670 B2
(45) Date of Patent: Oct. 20, 2020

(54) BICYCLE SUSPENSION COMPONENT AND ANALYSIS DEVICE

(71) Applicant: SRAM, LLC, Chicago, IL (US)

(72) Inventors: Trevor Krugman, Spearfish, SD (US); Jack Greetis, Spearfish, SD (US); James Meyer, Spearfish, SD (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 197 days.

(21) Appl. No.: 15/954,182

(22) Filed: Apr. 16, 2018

(65) Prior Publication Data

US 2018/0304952 A1 Oct. 25, 2018

Related U.S. Application Data

(60) Provisional application No. 62/488,334, filed on Apr. 21, 2017.

(51) Int. Cl.
*B62J 99/00* (2020.01)
*B62K 25/02* (2006.01)
(Continued)

(52) U.S. Cl.
CPC .............. *B62J 99/00* (2013.01); *B62K 25/02* (2013.01); *B62K 25/08* (2013.01); *B62K 25/286* (2013.01);
(Continued)

(58) Field of Classification Search
CPC .................. B60J 99/00; B60J 2099/002; B60J 2099/0013; B60J 2001/085; B62K 25/08;
(Continued)

(56) References Cited

U.S. PATENT DOCUMENTS 4,359,716 A 11/1982 Miyamaru et al.
8,864,160 B2 10/2014 Awasa
(Continued)

FOREIGN PATENT DOCUMENTS

CN 200992279 12/2007
CN 106103260 11/2016
(Continued)

OTHER PUBLICATIONS

Overholt, Zach, "Hayes / Manitou Test Sessions: Using high tech data acquisition to develop next level product", Bikerumor, Apr. 11, 2017, 19 pages, https://bikerumor.com/2017/04/11/hayes-manitou-test-sessions-using-high-tech-data-acquisition-to-develop-next-level-product/?utm_source=fee%E2%80%A6.

*Primary Examiner* — Robert A. Siconolfi
*Assistant Examiner* — San M Aung

(57) ABSTRACT

Example bicycle suspension components and analysis devices are described herein. An example suspension component includes a first tube and a second tube configured in a telescopic arrangement having an interior space, a spring system including a pneumatic chamber containing a mass of a gas forming a pneumatic spring configured to resist compression of the telescopic arrangement, and a suspension component analysis (SCA) device. The SCA device may include a pressure sensor to detect a pressure of the gas in the pneumatic chamber and provide a signal indicative of the detected pressure and circuitry configured to receive the signal. The circuitry and the pressure sensor are at least partially disposed in the interior space.

15 Claims, 22 Drawing Sheets

(51) Int. Cl.
*B62K 25/08* (2006.01)
*B62K 25/28* (2006.01)
*B62K 25/30* (2006.01)
*F16F 9/02* (2006.01)
*F16F 9/32* (2006.01)
*B62K 25/04* (2006.01)
*B62J 1/08* (2006.01)
*B60G 17/019* (2006.01)
*B62J 45/20* (2020.01)
*B62J 45/40* (2020.01)

(52) U.S. Cl.
CPC ............ *B62K 25/30* (2013.01); *F16F 9/0209* (2013.01); *F16F 9/3292* (2013.01); *B60G 17/019* (2013.01); *B60G 2204/111* (2013.01); *B60G 2204/4232* (2013.01); *B60G 2300/12* (2013.01); *B60G 2400/252* (2013.01); *B60G 2400/51222* (2013.01); *B60G 2800/91* (2013.01); *B62J 45/20* (2020.02); *B62J 45/40* (2020.02); *B62J 2001/085* (2013.01); *B62K 2025/044* (2013.01)

(58) Field of Classification Search
CPC ...... B62K 25/286; B62K 25/30; B62K 25/02; B62K 25/06; B60G 17/019; B60G 2204/111; B60G 2204/4232; B60G 2204/61; B60G 2300/12; B60G 2400/252; B60G 2400/51222; B60G 2400/5182; B60G 2800/91; B60G 2202/152; B60G 2202/24; B60G 2600/04; B60G 2600/042; B60G 2600/20; B60K 2370/155; B60K 2370/52; B60K 2370/1438; F16F 9/0209; F16F 9/0218
USPC ........ 188/266, 266.2; 280/276; 701/37, 31.9
See application file for complete search history.

(56) References Cited

U.S. PATENT DOCUMENTS

| | | | |
|---|---|---|---|
| 8,936,139 B2 | 1/2015 | Galasso et al. | |
| 9,186,949 B2 | 11/2015 | Galasso et al. | |
| 2011/0005387 A1* | 1/2011 | Ehre | F15B 15/2876 92/5 R |
| 2013/0134688 A1* | 5/2013 | Mochizuki | B62K 25/08 280/276 |
| 2013/0320647 A1* | 12/2013 | Awasa | B62M 25/08 280/276 |
| 2014/0095015 A1* | 4/2014 | Nieten | B60G 11/27 701/31.9 |
| 2015/0369328 A1* | 12/2015 | Sautier | F16F 15/00 188/1.11 E |
| 2016/0288866 A1 | 10/2016 | Toda | |
| 2017/0015384 A1 | 1/2017 | Kurita | |

FOREIGN PATENT DOCUMENTS

| | | |
|---|---|---|
| EP | 2357098 | 10/2014 |
| EP | 2939857 | 11/2015 |
| EP | 3121103 | 1/2017 |
| TW | 200942443 | 10/2009 |
| TW | I351365 | 11/2011 |

* cited by examiner

US 10,807,670 B2

BICYCLE SUSPENSION COMPONENT AND ANALYSIS DEVICE

This application claims priority to, and/or the benefit of, U.S. provisional patent application 62/488,334, filed on Apr. 21, 2017, the contents of which are incorporated herein in their entirety.

FIELD OF THE DISCLOSURE

This disclosure relates generally to bicycle suspensions and, more specifically, to devices for measuring and/or detecting suspension characteristics.

BACKGROUND

Bicycles and other vehicles are known to have suspension components to improve vehicle ride and performance. Suspension components can be used for various applications, such as cushioning impacts, vibrations, and/or other disturbances experienced by the bicycle during use. A common application for suspension components on bicycles is cushioning impacts or vibrations experienced by a rider when the bicycle is ridden over bumps, ruts, rocks, pot holes, and/or other obstacles. These suspension components include rear and/or front wheel suspension components. Suspension components may also be used in other locations on the bicycle, such as a seat post or handlebar, to insulate the rider from impacts.

SUMMARY

A suspension component for a bicycle disclosed herein includes a first tube and a second tube configured in a telescopic arrangement having an interior space, a spring system including a pneumatic chamber containing a mass of a gas forming a pneumatic spring configured to resist compression of the telescopic arrangement, and a suspension component analysis (SCA) device. The SCA device includes a pressure sensor to detect a pressure of the gas in the pneumatic chamber and provide a signal indicative or representative of the detected pressure and circuitry configured to receive the signal. The circuitry and the pressure sensor are at least partially disposed in the interior space.

A bicycle suspension component monitoring device disclosed herein includes a pressure sensor to detect a pressure of a pneumatic chamber and provide a signal indicative of the pressure, circuitry configured to process the signal, and a housing sized and shaped to fit within an interior space of a suspension component tube. The pressure sensor and the circuitry are disposed within the housing.

Figure 1:
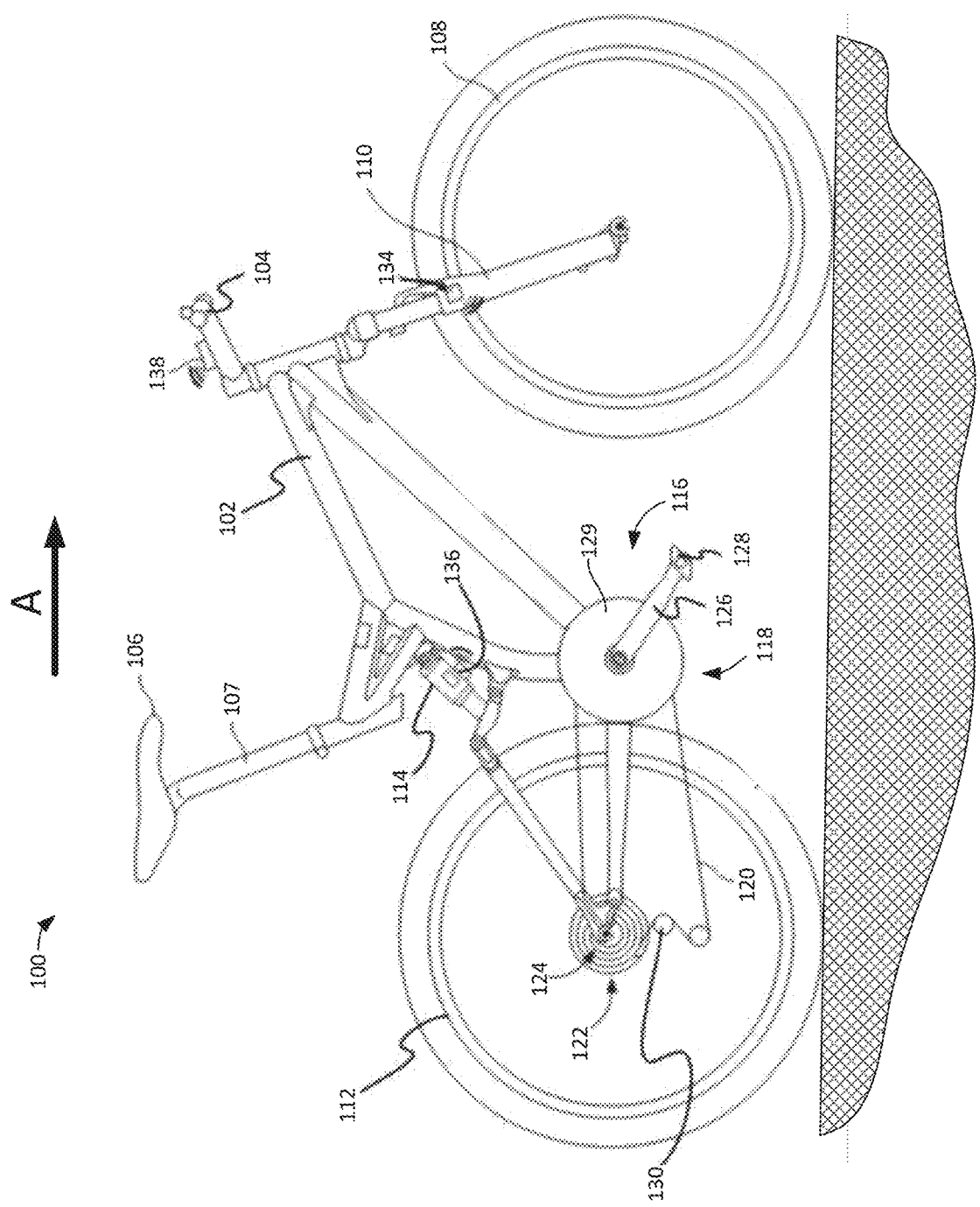
FIG. 1 is a side view of an example bicycle that may employ one or more suspension components and one or more suspension component analysis (SCA) devices constructed in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example suspension components and example suspension component analysis (SCA) devices for use with suspension components. The example SCA devices disclosed herein are used to analyze and/or otherwise measure or qualify one or more variables and/or characteristics of an associated suspension component, such as a suspension component on a bicycle.

The example SCA devices, which are electronic devices, include one or more characteristic measurement devices, such as a sensors, to measure or detect the characteristic(s) of the suspension component(s). By measuring and/or analyzing the characteristic(s), information about the suspension component(s) and a rider's style can be provided to the rider. This information can also be used to adjust or tune the suspension component(s) for improved performance. For example, on a bicycle, rider weight, riding style, and terrain greatly affect the performance of the suspension system. The performance of a suspension system may be represented by a suspension component's position and/or configuration versus time. This position and/or configuration may be characterized by a linear motion or position variable of the component. In some examples, an SCA device is used to measure a characteristic (e.g., a gas pressure) of a suspension component, which can be correlated to the position variable (e.g., via the ideal gas law). Additionally or alternatively, an SCA device may be used to directly measure the position variable of a suspension component. Once the motion or position variable is measured, other information can be derived, such as velocity, acceleration, position histograms, etc. By extension, direct measurement of other variables, such as velocity or acceleration, can be used to derive the position of the suspension versus time.

Once the position over time is measured and/or derived, information can be provided (e.g., via the SCA device and/or another device) that can aid a user in adjusting various settings of the suspension system to improve the performance of the system. In many cases, the suspension system includes settings that can be adjusted to the individual rider's need and environment. These adjustable settings may include, for example, air pressure, compression ratio, low speed compression damping, high speed compression damping, low speed rebound damping, high speed rebound damping, and/or other suspension settings.

There are a number of techniques that can be used to measure a position variable of a suspension component, or provide a derivative thereof. In addition there are a number of examples to couple and/or otherwise integrate an SCA device with a suspension component. Some of the measurement techniques that can be used by the example SCA devices to provide information indicating the position variable are gas pressure measurement, damper displacement measurement, linear movement measurement, optical measurement, magneto-resistive measurement, eddy current displacement measurement, strain measurement, as well as other measurement techniques and combinations thereof.

An example suspension component disclosed herein includes a first element, such as a first tube, and a second element, such as a second tube, that is displaceable relative to the first tube. The first and second tubes may be configured in a telescoping arrangement, for example. The first and second tubes may correspond two parts of any type of suspension component, such front fork or a rear shock. The first tube has a first end and the second tube has a second end. The first and second ends form distal ends of the telescoping arrangement. The first and second tubes move linearly relative to each other to absorb vibrations. For example, the first and second ends can be coupled to different parts or components of the bicycle to affect movement between the two parts. The suspension component includes a measurable condition that varies between a first displaced state and a second displaced state of the first and second tubes. The walls of the first and second tubes form an interior space that may include a damping system and/or a spring system that resist compression of the first end toward the second end and, thus, provide vibration damping.

An example SCA device disclosed herein includes one or more characteristic measurement device(s) (e.g., sensors) for measuring or detecting one or more characteristics of the suspension component, which can then be used to determine position and/or movement of the component and/or any other information about the suspension component. For example, the SCA device may include a pressure sensor to measure a gas pressure in a pneumatic chamber of a spring system in the suspension comment and provide a signal indicative of the detected pressure.

The SCA device may also include circuitry and a power source (such as a battery). The circuitry is configured to receive and process (e.g., interpret the signal(s) from the pressure sensor). In some examples, the circuitry is implement on a printed circuit board (PCB). In some examples, the PCB, the power source, and the pressure sensor are at least partially disposed within a housing. The SCA device (or at least the pressure sensor) is in fluid communication with the gas in the pneumatic chamber. By measuring the change in pressure as the suspension component compresses or expands, the pressure measurement(s) can be used to determine linear displacement of the suspension component based on the ideal gas law. In some examples, the SCA device includes a wireless communicator or wireless communication interface, such as an antenna, to wirelessly communicate the measurement(s) to another electronic device. The wireless communicator may communicate using any wireless technique. For example, Wifi, BLUETOOTH® Low Energy ("BLE"), Ant +™, and/or SRAM AIREA™, and other wireless communication techniques and/or protocols may be used.

In some examples, one or more elements of the SCA device is/are disposed within the interior space of the suspension component. The SCA device may be disposed within a pneumatic chamber (e.g., a pressure boundary or pressure zone) within the suspension component. For example, an SCA device may include a top cap that can be threaded into a top of an air spring system on a front fork. As such, the SCA device can be at least partially disposed within the pneumatic chamber. In such an example, the SCA device measures a pressure in the pneumatic chamber of the suspension component without the use of a tubing or hose.

In other examples, an SCA device may be disposed outside of the suspension component. The SCA device (or a sensor thereof) may be fluidly coupled to the pneumatic chamber within the suspension component via a tubing or hose and a port formed in the casing of the suspension component. The port may be separate from a gas fill port associated with the suspension component. Thus, use of the SCA device does not interfere with the ability to fill the pneumatic chamber of the suspension component.

In other examples, other types of sensors may be implemented to measure other characteristics. For example, an SCA device may include a strain gauge that can measure or detect the change in material strain of a gas pressurized chamber. The strain imparted in the material can be correlated to the change in pressure in the chamber and, thus, can be used to similarly determine linear displacement of the suspension component. In another example, an SCA device may include a sensor that directly measures linear displacement of the suspension component. For example, a sensor may be coupled to one tube, and the other tube may include a plurality of markings disposed along a length of the tube. As suspension component compresses or extends, the sensor detects the markings and, thus, can detect the linear position and/or movement of the tubes relative to each other.

These and other examples are described with reference to various figures. It is understood that the figures and descriptions set out herein are provided for illustration only and do not limit the invention to the disclosed examples. For example, the terms "first" and "second," "front" and "rear," or "left" and "right" are used in the detailed description for the sake of clarity and not as terms of limitation. Moreover, the terms refer to bicycle mechanisms conventionally mounted to a bicycle and with the bicycle oriented and used in a standard fashion unless otherwise indicated.

FIG. 1 illustrates one example of a human powered vehicle on which the example suspension components and devices for analysis thereof may be implemented. In this example, the vehicle is one possible type of bicycle 100, such as a mountain bicycle. The bicycle 100 has a frame 102, handlebars 104 near a front end of the frame 102, and a seat or saddle 106 for supporting a rider over a top of the frame 102. In the illustrated example, the saddle 106 is supported on a seat post assembly 107. A front and/or forward riding direction or orientation of the bicycle 100 is indicated by the direction of the arrow A in FIG. 1. As such, a forward direction of movement for the bicycle 100 is indicated by the direction of arrow A.

In the illustrated example, the bicycle 100 has a first or front wheel 108 carried by a first or front suspension component, such as a front fork 110, and supporting a front end of the frame 102. The bicycle 100 also has a second or rear wheel 112 supporting a rear end of the frame 102. The rear end of the frame 102 may be supported by a second or rear suspension component, such as a rear shock 114.

The bicycle 100 of FIG. 1 also has a drive train 116 with a crank assembly 118 that is operatively coupled via a chain 120 to a rear cassette 122. The cassette 122 is coupled with a rear hub 124 providing a rotation axis of the rear wheel 112. The crank assembly 118 includes at least one, and typically two, crank arms 126 and pedals 128, along with at least one front sprocket, or chainring 129. A rear gear change device 130, such as a derailleur, is disposed at the rear wheel 112 to move the chain 120 through different sprockets of the cassette 122. In some examples, a front gear changer device is provided to move the chain 120 through multiple sprockets of the crank assembly 118.

In the illustrated example, the front fork 110 includes a first suspension component analysis (SCA) device 134 (which may also be referred to as a suspension component monitoring device, a sensing device, or a detection device). The rear shock 114 may also, or alternatively, include a second SCA device 136. An SCA device is an electronic device used to measure or otherwise qualify one or more characteristics and/or other variables of a suspension component. Examples of SCA devices that may be implemented in connection with the front fork 110, the rear shock 114, and/or any other suspension component are disclosed in further detail herein. In the example illustrated in FIG. 1, two SCA devices are shown. However, in other examples, more or fewer SCA devices may be used on the bicycle. For example, suspension components integrated with a seat post or other components may include an SCA device.

In some examples, the bicycle 100 also includes a mobile device 138 that can communicate with the one or more SCA devices 134, 136 to provide an interface between the SCA device(s) 134, 136 and the user. The SCA device(s) 134, 136 can wirelessly transmit the measured characteristics to the mobile device 138. The mobile device 138 can include a display to present the measured characteristics to a user (e.g., a rider). In some examples, the mobile device 138 can perform further analysis using the measured characteristics to provide other information relating to the performance of one or more suspension components. Additionally or alternatively, the mobile device 138 can be provided to control one or more components of the bicycle 100, such as the front fork 110 and/or the rear shock 114. In one example, the mobile device 138 is a device distinct from the bicycle 100, such as a handheld mobile computing device, a smartphone, or other computer. Multiple mobile devices may also be used.

While the bicycle 100 depicted in FIG. 1 is a mountain bicycle, the front fork 110 and the rear shock 114 include the specific embodiments and examples disclosed herein as well as alternative embodiments and examples that may be implemented on other types of bicycles. For example, the disclosed front fork 110 and/or rear shock 114 may be used on road bicycles, as well as bicycles with mechanical (e.g., cable, hydraulic, pneumatic, etc.) and non-mechanical (e.g., wired, wireless) drive systems. The example front fork 110 and/or rear shock 114 may also be implemented on other types of two-, there-, and four-wheeled human powered vehicles.

As disclosed above, various characteristic(s) of a suspension component may be measured and used to determine performance of a suspension system. In some examples, gas pressure is measured. For example, an SCA device can include a sensor operative to measure a gas pressure in a suspension system to calculate the suspension displacement and/or a derivative thereof. The SCA device may be implemented to measure the pressure (gage pressure or absolute pressure) of a mass of gas within a bicycle suspension system. The gas may be contained in a particular volume or chamber of a suspension component. In some examples, the SCA device includes a pressure sensor, such as an electro-mechanical pressure sensor, to convert a measured gas pressure into an electrical signal through a piezo-resistive or other effect. This signal can then be analyzed to determine the change of pressure within the suspension system and/or the measured volume or chamber. This change in pressure is directly related to the displacement of system components, with the displacement being derivable through fluid dynamics calculations such as the ideal gas law. In some examples, the derived values are generated with additional considerations for the derivation, including compensation for diabatic and other external effects that may limit the assumptions required for ideal gas law calculations.

In another example, damper displacement of a suspension component is measured. For example, an SCA device including a sensor configured to measure the displacement of a damper head/body may be implemented to correlate to suspension system displacement and/or a derivative thereof. The sensor measures the displacement of a suspension damper as a direct correlation to the amount of suspension travel. Viscous fluids are often used in combination with adjustable orifices to generate a damping effect on suspension travel. In many cases, dampers often move through a chamber of fluid. By measuring the displacement of the damper fluid or the damper head, the displacement of the suspension system can be measured.

In another example, linear movement is measured. For example, an SCA device including a sensor operative to measure linear movement employing sensor measurement technologies such as linear (binary like) encoding are used to calculate suspension displacement and/or its derivatives. The SCA device is used to measure the linear movement of suspension system displacement on a bicycle. Bicycle suspension systems may utilize shafts or tubes to manage the linear motion of travel. These shafts can be encoded with a binary-like set of markings to enable a sensor (e.g., a reader) to take measurements of suspension displacement positions. These measurements are then used to generate displacement versus time plots that can be analyzed for other uses. As such, the measurement of the linear movement may involve laser marking, etching, and/or engraving on a stanchion of the suspension component.

In some examples, RS sag laser etching is used on a stanchion of the suspension component. The RS sag laser etching may be used in combination with an optical sensor for linear movement measurement. In some examples, optical measurements are used to implement displacement measurements. For example, an SCA device using an optical sensor configured to measure suspension displacement and/or a derivative thereof is used. The SCA device measures the displacement of a bicycle suspension system by utilizing an optical sensor. The optical sensor can be used to determine suspension travel by looking for indicator marks on suspension components, or the direct proximity of a moving component relative to another static mounted component.

In another example, magneto-resistive sensor techniques are used for displacement measurement. For example, an SCA device may utilize a sensor operative to measure magneto-resistive properties of suspension components to determine the position of the components relative to each other. In one example, a magnet is disposed on one suspension component, and a magneto-resistive material is disposed on a second component that moves relative to the first component. The change in resistance of the magneto-resistive material can be measured to determine the position of the first component.

In another example, eddy current displacement sensor techniques may be used for displacement measurement. For example, an SCA device may use a sensor operative to measure eddy currents to determine the relative displacement of suspension components to calculate suspension displacement and/or a derivative thereof. The sensor measures the position of suspension components relative to each other through the measurement of eddy current effects. As metallic components move relative to each other, the amplitude and phase differences measured in the eddy currents can determine the relative positions of the components. This technique may be used to establish relative positions between small displacement components such as internal floating pistons.

In another example, material strain is measured. For example, an SCA device can include a sensor operative to measure strain of a gas pressurized chamber that can be used to calculate bicycle suspension displacement and/or a derivative thereof. The SCA device measures the strain imparted into system components due to changes in pressurized gas chambers. The strain of a component due to internal gas pressure can be directly measured through the application of a strain measuring sensor, such as one or more strain gages, to the external walls of a pressurized chamber. These strain gages measure the strain in the chamber material, which is then related to stress in the material via Young's Modulus. This stress then directly correlates to an internal pressure, which can be utilized to calculate the displacement of the suspension system through ideal gas laws or other techniques. In some examples, diabatic effects of the pressurized gas system are taken into account for the calculation.

An SCA device may be integrated into suspension components using various techniques. For example, external mounting of SCA devices, internal mounting of SCA devices, as well as other techniques, or combinations thereof, may be used. These integration techniques can be used to measure a position of a suspension component using the measurement techniques described above or other techniques.

In some examples, an SCA device is integrated with a suspension component, such as a suspension fork. For example, an SCA device may include a pressure sensor and be internally mounted with a suspension fork top cap. The SCA device can include a housing or coupling features and be threaded directly into a gas pressurized chamber on a bicycle suspension component. In the case of a suspension fork, the SCA device may be integral with a suspension top cap. A housing of the SCA device can be cylindrical in shape and include one or more coupling features, such as external threads, for threaded engagement with suspension fork top cap threads.

Figure 2:
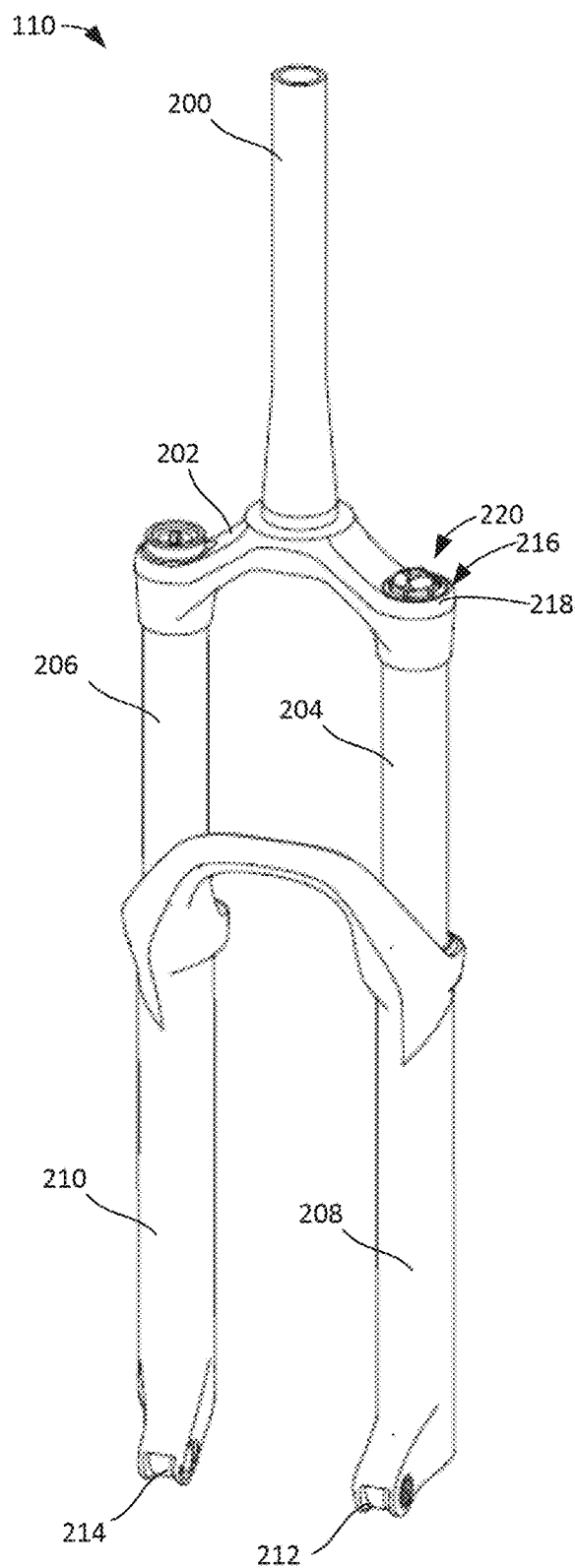
FIG. 2 is a perspective view of an example front fork (a suspension component) of the bicycle of FIG. 1 and an example SCA device that may be implemented with the front fork.

For example, FIG. 2 shows the front fork 110 of the example bicycle 100 of FIG. 1. The front fork 110 includes a steering tube 200, a crown 202, first and second upper legs 204, 206 (sometimes referred to as inner legs or stanchions), and first and second lower legs 208, 210 (sometimes referred to as sliders). The steering tube 200 couples to the frame 102 (FIG. 1) and the handlebars 104 (FIG. 1). The first and second upper legs 204, 206 are slidably received within the respective first and second lower legs 208, 210. The first and second lower legs 208, 210 include respective front wheel attachment portions 212, 214, such as holes or dropouts, for attaching the front fork 110 to the front wheel 108 (FIG. 1).

The first and second upper legs 204, 206 move into and out of the first and second lower legs 208, 210 to absorb vibrations. In particular, the legs 204, 206, 208, 210 of the front fork 110 form a suspension system. The suspension system may include both a damping system, or damper, and a spring system. In this example, the spring system is disposed in and/or otherwise integrated into the first upper and lower legs 204, 208 and the damper is disposed in and/or otherwise integrated into the second upper and lower legs 206, 210. The spring system may employ a spring element, such as a coil spring, elastomeric spring, air spring, and/or other spring element. The spring system and the damper act in concert to absorb vibrations while returning the front fork 110 to an extended position. In other examples, the spring system may be disposed in and/or otherwise integrated into the second upper and lower legs 206, 210 and the damper may be disposed in and/or otherwise integrated into the first upper and lower legs 204, 208.

Figure 4:
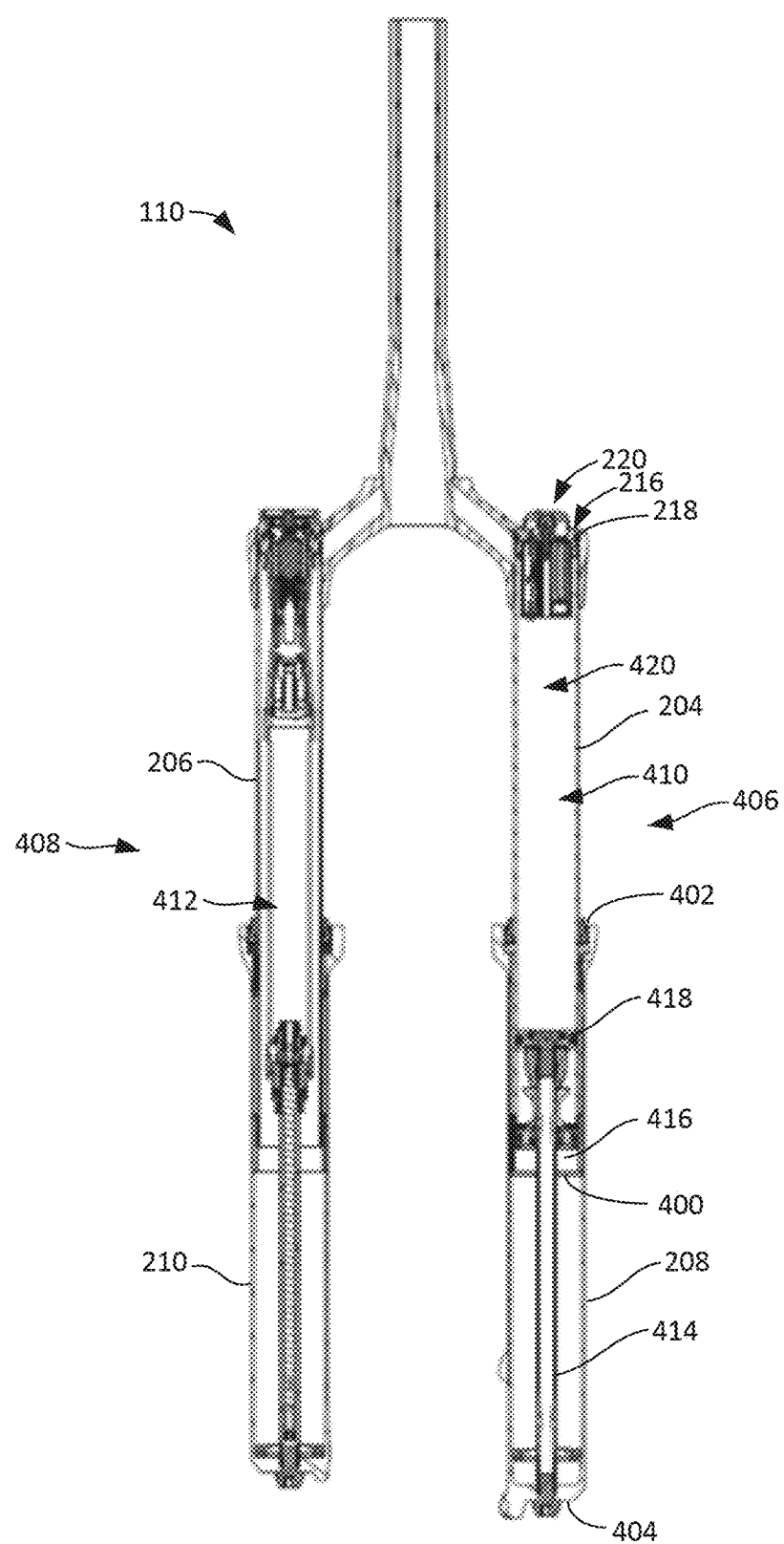
FIG. 4 is a cross-sectional view of the example front fork and SCA device of FIG. 2.

In this example, the first upper and lower legs 204, 208 include an air spring, formed by a pneumatic chamber in the first upper leg 204 (shown in further detail in FIG. 4). In some examples, the pneumatic chamber is pressurized with a gas (e.g., air). Typically, a top cap, which includes a valve such as a Schrader or presta type valve, is coupled to an opening 216 in a top end 218 of the first upper leg 204. The valve seals the top cap to keep gas from leaving the pressurized chamber of the front fork 110.

In this example, an example SCA device 220 is integrated with a top cap (the top cap 302 labeled in FIG. 3 and discussed in further detail below) and disposed within the pressurized chamber in the first upper leg 204. In particular, the example SCA device 220 is configured to be disposed within the opening 216 in the top end 218 of the first upper leg 204. The SCA device 220 includes one or more sensors for measuring a characteristic of the front fork 110, such as the pressure of the gas in the pressurized chamber. The SCA device 220 of FIG. 2 may correspond to the SCA device 134 of FIG. 1, for example.

Figure 3:
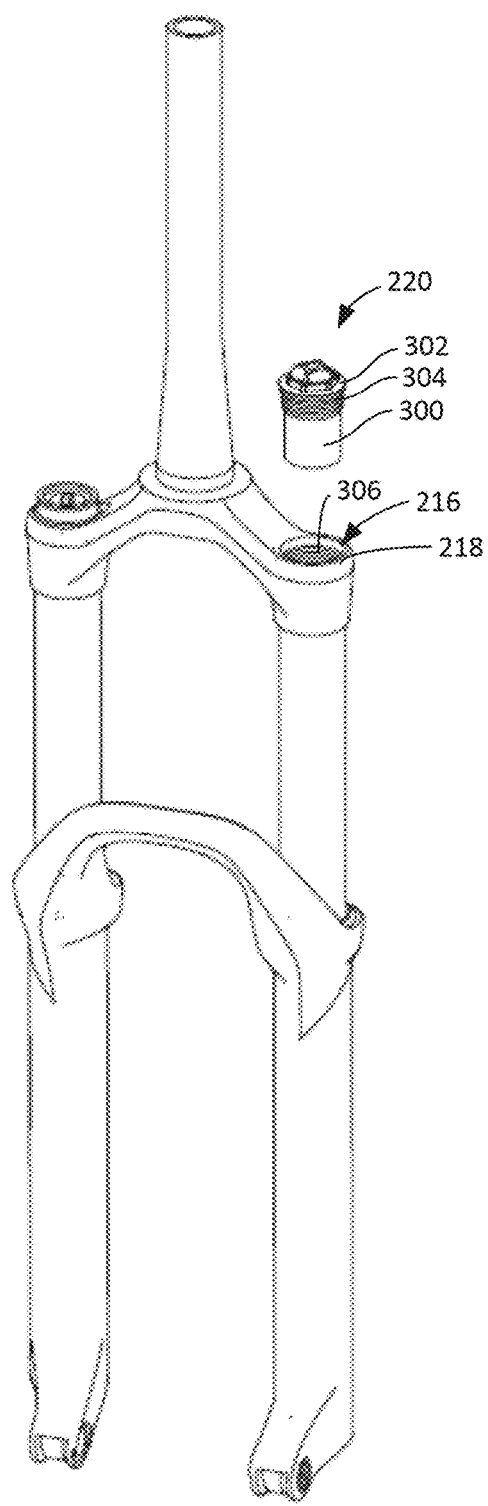
FIG. 3 shows the example front fork of FIG. 2 with the example SCA device removed.

FIG. 2 shows the example SCA device 220 as disposed in the opening 216 and FIG. 3 shows the SCA device 220 removed from the opening 216. As shown in FIG. 3, the SCA device 220 includes a housing 300. In some examples, the housing 300 contains a sensor and/or other electronic components, as disclosed in further detail herein. The housing 300 is coupled to a top cap 302 having a threaded portion 304. The threaded portion 304 mates (e.g., via threaded engagement) with threads 306 in the opening 216, such that the SCA device 220 can be coupled to the opening 216 of the pressurized chamber.

FIG. 4 is a cross-sectional view of the front fork 110 and the SCA device 220. As shown, the first upper leg 204 is slidably received within the first lower leg 208, and the second upper leg 206 is slidably received within the second lower leg 210. The first and second upper legs 204, 206 and the respective first and second lower legs 208, 210 form a telescopic arrangement. The first upper leg 204 includes the top end 218 and a bottom end 400 opposite the top end 218. The first lower leg 208 includes a top end 402 and a bottom end 404 opposite the top end 402. The top end 218 of the first upper leg 204 and the bottom end 404 of the first lower leg 208 form first and second distal ends of the suspension component. During compression, the top end 218 (the first distal end) moves toward the bottom end 404 (the second distal end), and during extension, the top end 218 moves away from the bottom end 404. The second upper and lower legs 206, 210 have a similar arrangement.

In the illustrated example, the first upper and lower legs 204, 208 include a spring system 406 and the second upper and lower legs 206, 210 include a damper 408. The spring system 406 is configured to resist compression of the top end 218 (the first distal end) toward the bottom end 404 (the second distal end) and return the first upper and lower legs 204, 208 to the extended position (the position shown in FIG. 4) after compression occurs. The damper 408 is configured to limit the speed at which the compression/extension occurs and/or otherwise absorb vibrations. The spring system 406 is disposed within and/or otherwise defined by an interior cavity or space 410 of the first upper and lower legs 204, 208 bounded by the walls of the first upper and lower legs 204, 208. Similarly, the damper 408 is disposed within and/or otherwise defined by an interior space 412 formed by the walls of the second upper and lower legs 206, 210.

The spring system 406 can include one or more pneumatic chambers. For example, as shown in FIG. 4, a stem 414 extends upward from the bottom end 404 of the first lower leg 208 and through a seal 416 in the bottom end 400 of the first upper leg 204. A piston 418 is coupled to the stem 414 and disposed within first upper leg 204. The piston 418 is slidable within the first upper leg 204. A pneumatic chamber 420 is formed between the piston 418 and the top end 218 of the first upper leg 204 (which is sealed by the SCA device 220). In some examples, the pneumatic chamber 420 is filled with a mass of compressed gas having a higher pressure than ambient pressure. Therefore, in this example, the pneumatic chamber 420 forms a pressurized chamber 420 (sometimes referred to as a high pressurize zone or positive spring chamber). When the front fork 110 compresses and the ends of the first upper and lower legs 204, 206 move toward each other, such as when riding over a bump, the piston 418 moves toward the top end 218 of the first upper leg 204. As a result, the volume of the pressurized chamber 420 decreases and, thus, the pressure of the gas within the pressurized chamber 420 increase. After the compression, the increased pressure acts to push the ends of the first upper and lower legs 204, 206 away from each other, thereby acting as a spring to return the front fork 110 to its original or riding set up. The pressure of the gas in the pressurized chamber 420 can be correlated to the linear displacement of the first upper and lower legs 204, 208 using the ideal gas law. Therefore, pressure values obtained by measuring the pressure in the pressurized chamber 420 can be used to determine displacement and/or movement of the front fork 110.

In the illustrated example, the SCA device 220 is disposed in the opening 216 in the top end 218 of the first upper leg 204. In this example, the SCA device 220 is disposed within the interior space 410 of the first upper and lower legs 204, 208 and closes or seals the opening 216 to maintain the pressurized gas in the pressurized chamber 420.

Figure 5:
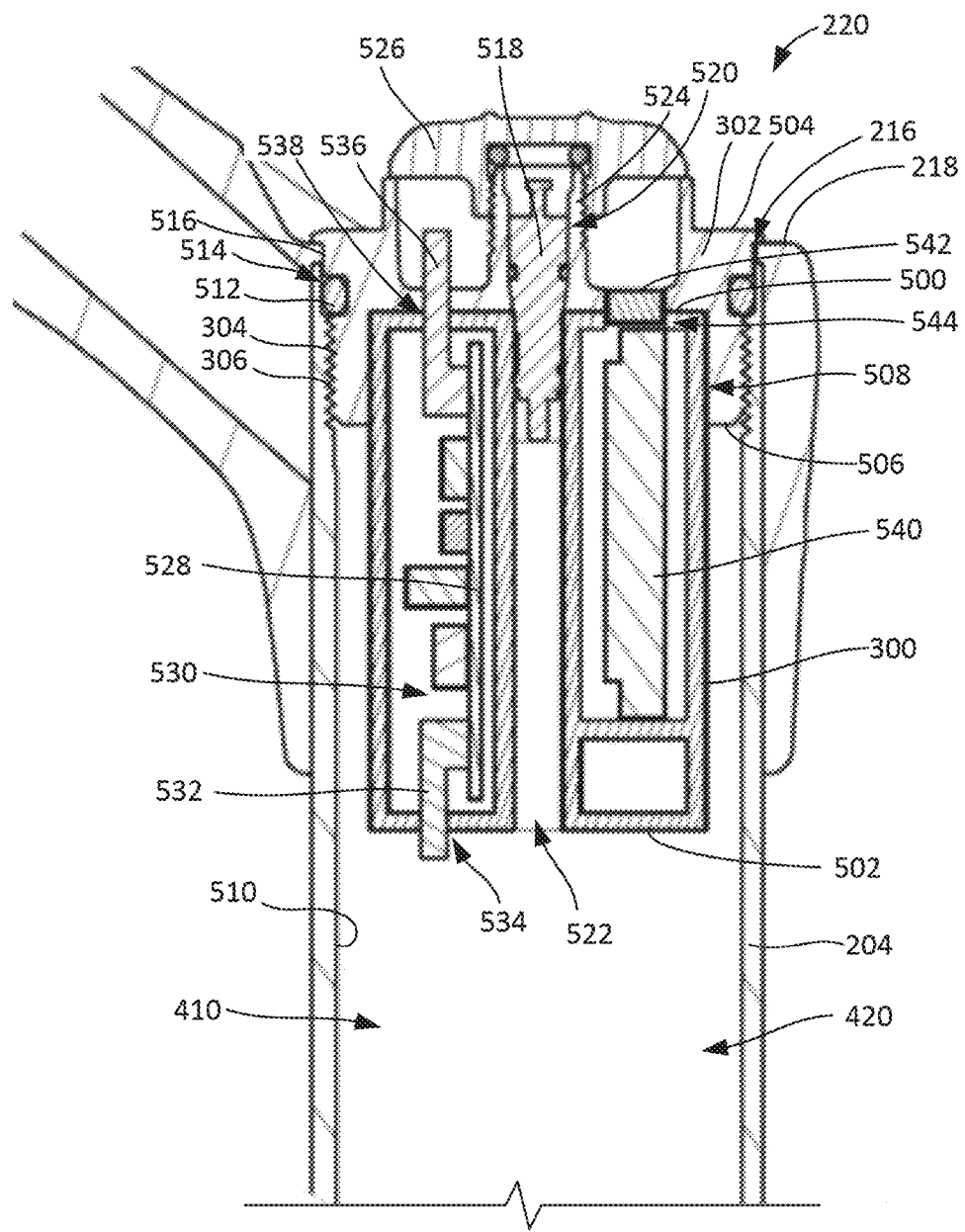
FIG. 5 is an enlarged view of the example SCA device of FIG. 4.

FIG. 5 is an enlarged view of the SCA device 220 disposed in the opening 216 in the top end 218 of the first upper leg 204. The SCA device 220 includes the housing 300. The housing 300 is sized and shaped to fit within the first upper leg 204. In this example, the housing 300 is cylindrical. In other examples, the housing 300 may be shaped differently. The housing 300 has a first end 500 (e.g., a top end) and a second end 502 (e.g., a bottom end) opposite the first end 500.

In this example, the SCA device 220 also includes a capping member, such as the top cap 302, which is used to couple the SCA device 220 to the opening 216. The housing 300 is coupled to the top cap 302. The top cap 302 includes a top side 504 and a bottom side 506 opposite the top side 504. In the illustrated example, the first end 500 of the housing 300 is disposed within a bore 508 (e.g., a recess, a cavity, an opening) formed in the bottom side 506 of the top cap 302. The housing 300 extends downward from the top cap 302. The housing 300 may be coupled to the top cap 302 via an interference fit (e.g., a friction fit), for example. Additionally or alternatively, the housing 300 may be coupled to the top cap 302 via other manners, such using as an adhesive or a threaded fastener.

In the illustrated example, the top cap 302 includes the threaded portion 304 that mates with the threads 306 on an inner surface 510 of the first upper leg 204. When the top cap 302 is threaded into the opening 216, the housing 300 is disposed in the interior space 410 of the first upper leg 204 and within the pressurized chamber 420. In other examples, the SCA device 220 may be disposed within the interior space 410 but separated from the pressurized chamber 420, an example of which is disclosed in further detail herein in connection with FIG. 6.

In some examples, the top cap 302 includes a sealing member, such as a seal 512 (e.g., an O-ring), to pneumatically seal an interface of the top cap 302 and the first upper leg 204. The seal 512 is disposed in a groove 514 (e.g., a gland) formed in an outer surface 516 of the top cap 302. When the top cap 302 is threaded into the opening 216, the seal 512 is trapped between the outer surface 516 of the top cap 302 and the inner surface 510 of the first upper leg 204. The seal 512 ensures no leakage occurs past the top cap 302.

In the illustrated example, the SCA device 220 includes a valve 518 to control gas flow into or out of the pressurized chamber 420. The valve 518 may be a Schrader or presta type valve. The valve 518 enables compressed gas to be pumped into the pressurized chamber 420 (e.g., for filing the pressurized chamber 420), while preventing the compressed gas from escaping the pressurized chamber 420. The valve 518 may also be operated to release some of the gas from the pressurized chamber 420.

In the illustrated example, the top cap 302 includes an opening 520 that is aligned with an opening 522 that extends through the housing 300. The openings 520, 522 form a passageway between the pressurized chamber 420 and the atmosphere. The valve 518 is disposed partially in each of the openings 520, 522. In other examples, the valve 518 may be fully disposed in one of the openings 520, 522.

In the illustrated example, the top cap 302 includes a threaded stem 524 extending upward from the top side 504. In some examples, the SCA device 220 includes a cover 526 (e.g., a second cap) to be coupled to the threaded stem 524 to cover at least a portion of the top cap 302. For example, the cover 526 can be threaded onto the threaded stem 524 and used to cover the valve 518. If a user desires to change the amount of air in the pressurized chamber 420, the user can remove the cover 526 and operate the valve 518. For example, a user may open the valve 518 (e.g., by contact with an air hose) and add pressure to the pressurized chamber 420 by pumping gas through the openings 520, 522 and into the pressurized chamber 420. Thus, a user can interact with the air pressure in the pressurized chamber 420 without having to remove the SCA device 220.

The SCA device 220 includes circuitry configured to receive and process (e.g., interpret) the signal(s) from one or more sensors. In this example, the circuitry is implemented as a printed circuit board (PCB) 528. The PCB 528 includes a substrate or board and circuitry built on the substrate. The circuitry may also analyze and/or condition the signals (e.g., perform AC/DC conversion, filtering, etc.). The PCB 528 (and the substrate thereof) is disposed within a cavity 530 in the housing 300. In some examples, the housing 300 is sealed to isolate the cavity 530 from outside air. As such, in some examples, the PCB 528 is isolated from the compressed gas in the pressurized chamber 420. In other examples, the cavity 530 may be exposed to gas in the pressurized chamber 420.

As disclosed herein, the SCA device 220 may include one or more characteristic measurement devices. In this example, the SCA device 220 includes a pressure sensor 532 to detect or measure the pressure of the gas within the pressurized chamber 420. The pressure sensor 532 provides one or more signals indicative of the detected pressure. The pressure sensor 532 is communicatively coupled to the PCB 528. The PCB 528 interprets and/or analyzes the signal(s) from the pressure sensor 532.

In the illustrated example, the pressure sensor 532 extends through an opening 534 in the second end 502 of the housing 300. As a result, the pressure sensor 532 is in fluid communication with the compressed gas in the pressurized chamber 420 and can measure the pressure in the pressurized chamber 420. In other examples, the pressure sensor 532 may extend from another side or surface of the housing 300. In still other examples, the pressure sensor 532 may not extend from the housing 300. Instead, the pressure sensor 532 can be disposed completely within the cavity 530. In such an example, the cavity 530 may be in fluid communication with the pressurized chamber 420 such that the pressure inside of the cavity 530 is the same as in the pressurized chamber 420. Thus, the pressure sensor 532 can be disposed within the housing 300 and still be in fluid communication with the pressurized chamber 420.

In some examples, the SCA device 220 includes a wireless communicator or wireless communication interface, such as a radio and/or antenna with associated circuitry, in electrical communication with circuitry of the PCB 528. The wireless communication interface transmits a wireless signal representative of the pressure of the pressurized chamber 420. For example, in FIG. 5, the SCA device 220 includes an antenna 536. The antenna 536 is coupled to the PCB 528 in the housing 300.

The wireless communication interface may be integrated with the PCB 528, or a substrate thereof, or may be located remotely from the PCB 528 to be better positioned for wireless communication with devices external to the suspension component (e.g., in a position such that a wireless signal can exit the interior space 410 of the first upper leg 204). The antenna 536 may be disposed in an environmentally unsealed location, such as outside a pressure boundary, while being communicatively connected to the PCB 528 disposed in an environmentally sealed space, for example the cavity 530 or otherwise inside the pressure boundary. In the illustrated example, the antenna 536 extends through an opening 538 in the first end 500 of the housing 300 and through the top cap 302. Thus, the antenna 536 is at least partially disposed in the top cap 302. As such, fewer obstructions are disposed in the path of the antenna signal. However, in other examples, the antenna 536 may be disposed in another location or completely within the housing 300. In some examples, the housing 300 may be constructed of a relatively thin material so as not to interfere with the transfer of wireless signals.

Other parts of the SCA device may also be disposed in an unsealed environment. For example, in the embodiments disclosed in FIGS. 5 and 6, as well as other embodiments such as those described with respect to FIG. 10, a second pressure sensor may be used. The second pressure sensor may be configured to measure pressure external to pressurized chamber 420, for example an environmental pressure. In an embodiment, such as those disclosed in FIGS. 5 and 6, the second pressure sensor may be disposed external to the top cap 302, having a communication cable that extends through an opening in the first end 500 of the housing 300 and through the top cap 302, communicatively connecting the second pressure sensor to the PCB 528. Thus, the second pressure sensor may be at least partially disposed in the top cap 302. As such, the second pressure sensor may be exposed to an unsealed space and/or exposed to an environmental pressure of the SCA device 220.

The SCA device 220 also includes a power supply. The power supply provides power to the PCB 528, the pressure sensor 532, the wireless communication interface (e.g., the antenna 536), etc. The power supply may or may not be disposed within the pressurized chamber 420. In the illustrated example, the power supply is implemented as a battery 540. The battery 540 is disposed within the housing 300. The battery 540 may be disposed within the same cavity 530 as the PCB 528 or another cavity of the housing 300. As such, while the battery 540 is located within the interior space 410 of the first upper leg 204, the battery 540 may remain isolated from the pressurized chamber 420.

In some examples, the power supply can be changed without removing the top cap 302 from the front fork 110. The SCA device 220 may include a movable power supply cover that enables installation and/or removal of the power supply. For example, as shown in FIG. 5, the SCA device 220 includes a door 542 (e.g., a lid, a cover, etc.) that is disposed in an opening 544 formed through the first end 500 of the housing 300 and through the top cap 302. The door 542 may be completely removable or may be hingeably coupled at one edge. The door 542 can be opened to enable removal/insertion of the battery 540. In other examples, the top cap 302 and/or the housing 300 are removed to change the battery 540.

In some examples, an SCA device with a pressure sensor may be disposed internal to a suspension component, such as a fork leg of a suspension fork, but removable from the fork leg without depressurizing the gas from the fork leg. For example, the SCA device may include a housing containing other components of the SCA device, with the housing sized and shaped to be accepted within a top cap space of the fork. Installation and removal of such an SCA device may be achieved through the use of at least two valves.

Figure 6:
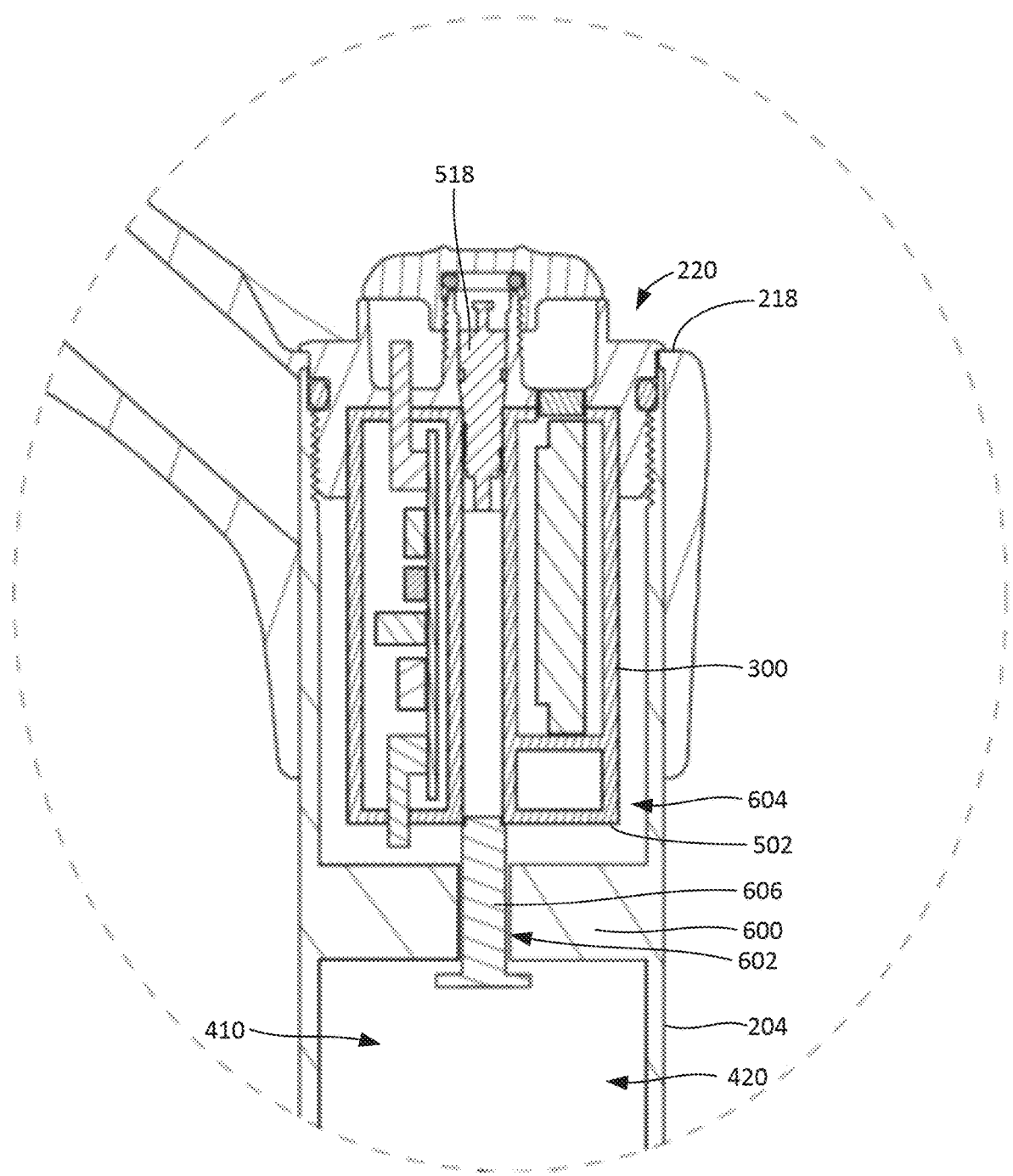
FIG. 6 is another enlarged view of the SCA device of FIG. 4 where the front fork has a barrier between the SCA device and a pneumatic chamber.

For example, as shown in the illustrated example of FIG. 6, the first upper leg 204 may include a barrier 600 (e.g., a wall) with an opening 602 that separates the pressurized chamber 420 from an upper chamber 604, which may be referred to as a top cap space or an electronic chamber. The upper chamber 604 is formed between the barrier 600 and the top end 218 of the first upper leg 204. The SCA device 220 is to be disposed in the upper chamber 604. In the illustrated example, a second valve 606 is disposed in the opening 602 in the barrier 600 and controls the flow of gas between the two chambers 420, 604. The second valve 606 may be, for example, a Schrader or presta type valve.

When the SCA device 220 is installed, the second end 502 of the housing 300 engages and/or otherwise interacts with the second valve 606 to open the second valve 606. As such, the compressed gas in the pressurized chamber 420 also fills the upper chamber 604. Therefore, the SCA device 220 can detect the pressure of the gas in the upper chamber 604. Thus, in this example, while the SCA device 220 is disposed in the interior space 410 of the first upper leg 204, the SCA device 220 is separated from the pressurized chamber 420. The valve 518 of the SCA device 220 can be operated the same as disclosed above to fill the pressurized chamber 420 or release pressure from the pressurized chamber 420.

If the SCA device 220 is removed from the upper chamber 604, the second valve 606 closes, thereby sealing the compressed gas in the pressurized chamber 420. In this manner, the SCA device 220 can be used to set up one suspension component and then removed from the first suspension component and used to set up another, second, suspension component while leaving the first suspension component sealed and/or otherwise operable.

While in the examples of FIGS. 2-6 the SCA device 220 is disposed within and/or integrated into the suspension component, in other examples, an SCA device with a pressure sensor can provided as a hybrid internal and externally mounted device. For example, one or more components of an SCA device may be integrated with, or as, a suspension fork top cap, while other components of the SCA device may be mounted external to the suspension fork. The pressure sensor may be located inside a pressure boundary of the suspension component, such as within the top cap of a suspension fork, while the PCB, wireless communication interface, and/or battery may be located in an electronics module disposed outside of the pressure boundary with the sensor being electrically, or otherwise remotely, connected to the electronics module.

Figure 7:
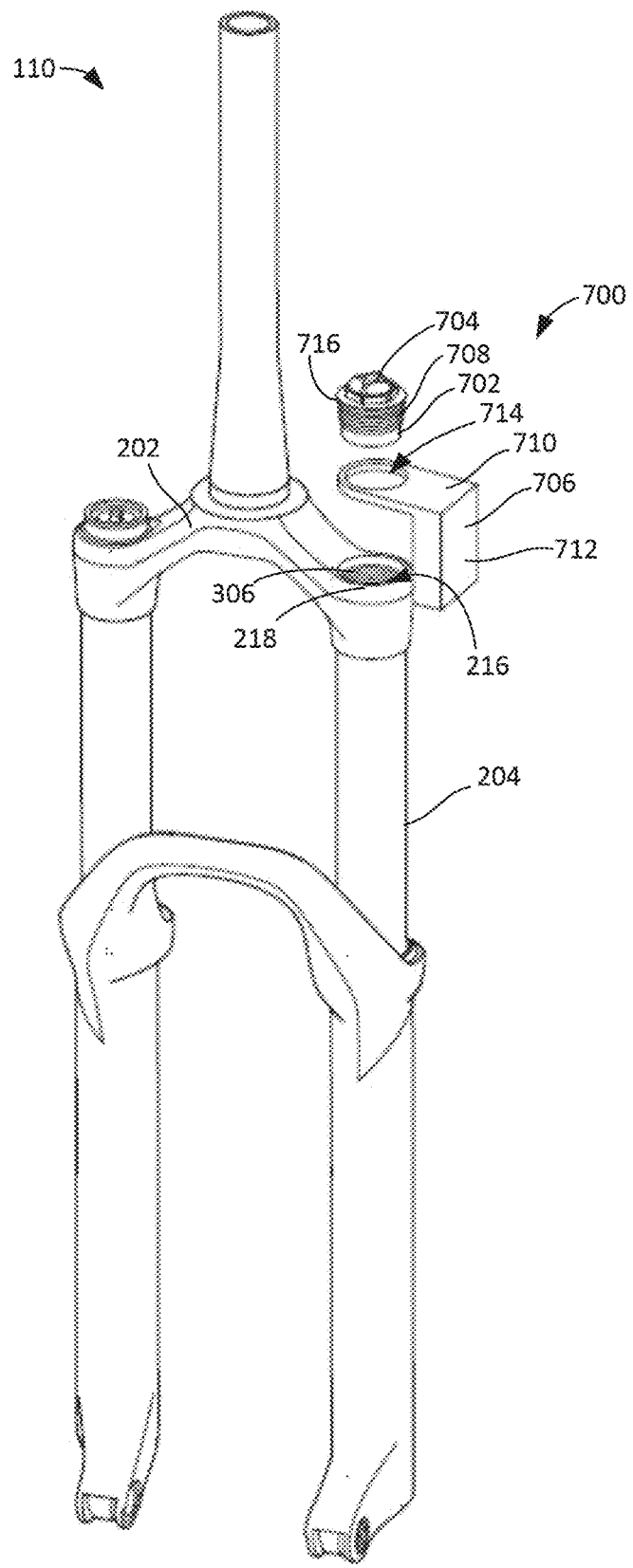
FIG. 7 is a perspective view of the example front fork of the bicycle of FIG. 1 and another example SCA device that may be implemented with the front fork.

For example, FIG. 7 illustrates another example SCA device 700 that can be implemented in connection with the front fork 110. The SCA device 700 may correspond to the SCA device 134 of FIG. 1, for example. In this example, the SCA device 700 includes a housing 702, a top cap 704, and an electronics module 706. The housing 702 is coupled to and/or otherwise integrated with the top cap 704, similar to the SCA device 220 disclosed above. The top cap 704 includes a threaded portion 708 that mates with the threads 306 in the opening 216 of the first upper leg 204. Similar to the SCA device 220 disclosed above, the housing 702 includes a sensor, such as a pressure sensor. Therefore, when the top cap 704 is coupled to the opening 216, the housing 702 and the pressure sensor are disposed within the pressurized chamber 420 (FIG. 4). The pressure sensor can detect or measure the pressure of the gas in the pressurized chamber 420, similar to the operations disclosed above.

In the illustrated example, the electronics module 706 includes a flange section 710 and a compartment 712. The compartment 712 houses electronic components, such as a PCB, a communication interface, a battery, etc. similar to the electronics disposed in the housing 300 disclosed above. To couple the electronics module 706 to the housing 702 and the top cap 704, the flange section 710 includes an opening 714 that is sized to receive the housing 702 and the threaded portion 708 of the top cap 704. The top cap 704 includes a lip 716 (e.g., a rim, a ledge, etc.) that has a larger diameter than the opening 714 in the flange section 710. To assemble the example SCA device 700, the housing 702 and the threaded portion 708 of the top cap 704 may be inserted through the opening 714 and into the opening 216. When the top cap 704 is threaded into the opening 216, the flange section 710 is clamped between the lip 716 on the top cap 704 and the top end 218 of the first upper leg 204. As such, in this example, the sensor is disposed internally to the suspension component while the electronics module 706 is disposed externally to the suspension component.

As mentioned above, the compartment 712 may contain the PCB, the communication interface, the battery, etc. The electronics module 706 may include one or more wires, connectors, contact points, etc. that form an electrical connection between the electronics in the compartment 712 and the sensor in the housing 702. For example, one or more metal contact points may be disposed on an inner surface of the opening 714, and matching contact points may be provided on the threaded portion 708 and/or the lip 716 of the top cap 704. The contact points on the top cap 704 may be coupled to the sensor in the housing 702. In this manner, an electrical connection is formed between the sensor in the housing 702 and the electronics in the compartment 712 when top cap 704 is coupled to the flange section 710. In other words, electrical connection occurs after the top cap 704 has been installed on the first upper leg 204. In other examples, the electronics module 706 may be coupled to the top cap 704 in other manners after the top cap 704 has been coupled to the first upper leg 204.

In this example, the flange section 710 and the compartment 712 are coupled at a 90 degree (°) angle. As such, when the flange section 710 is coupled to the top end 218 of the first upper leg 204, the compartment 712 extends downward along an outer surface of the first upper leg 204. As a result, the shape of the electronics module 706 prevents simultaneous rotation of the electronics module 706 and top cap 704. In other words, the top cap 704 may be rotated, but the electronics module 706 cannot rotate without interfering with the crown 202. In other examples, the electronics module 706 may be shaped differently to allow rotation with the top cap 704.

In some examples, an SCA device may be mounted to a lower leg, or lower leg casting, of a suspension fork. The SCA device may be configured to interact with a port in the front fork to access a pneumatic chamber within the lower leg. This pneumatic chamber (e.g., a pressurized chamber) may be a primary positive air spring or a residual air chamber. If the pneumatic chamber is a residual air chamber, the chamber would only contain gas that is trapped during assembly of the upper legs and the lower legs. This means at full extension the gas pressure is very low or nearly ambient air pressure levels. During compression of the front fork, the air pressure increases, but even at full compression the maximum air pressure is much lower than that of a positive air spring at full compression. Measuring the residual air pressure in the lower leg with an SCA device that includes a pressure sensor enables the sensor device to operate with a front fork having a metal coil compression spring as the primary spring.

Figure 8:
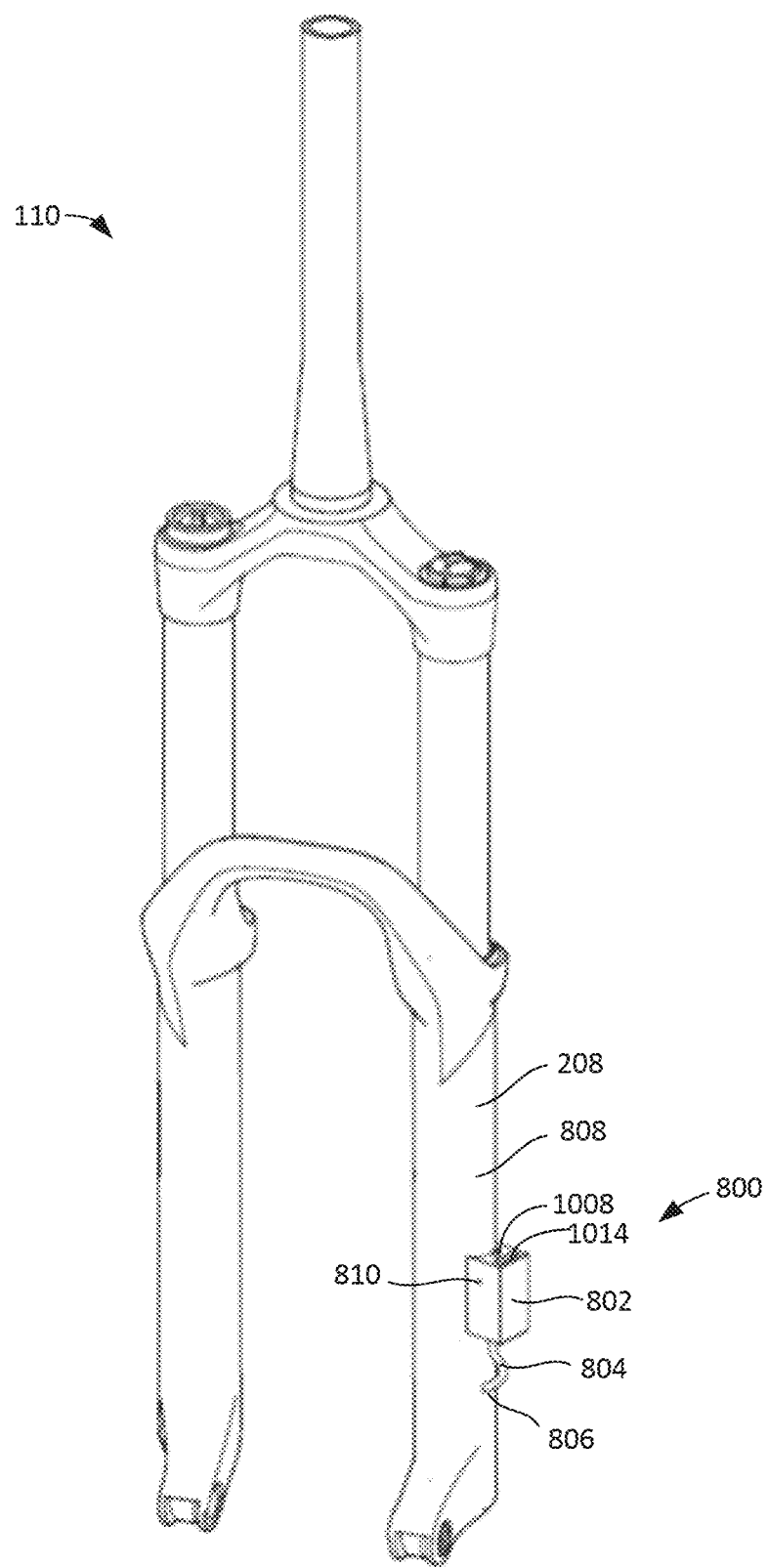
FIG. 8 is a perspective view of the example front fork of the bicycle of FIG. 1 and another example SCA device that may be implemented with the front fork.

For example, FIG. 8 illustrates another example SCA device 800 that can be implemented in connection with the front fork 110. The SCA device 800 of FIG. 8 may correspond to the SCA device 134 of FIG. 1, for example. The SCA device 800 can be used to detect or measure one or more characteristics occurring in the first lower leg 208 of the front fork 110. In the illustrated example, the SCA device 800 includes a housing 802 that is fluidly coupled via a hose 804 to a port 806 (e.g., an opening) in the first lower leg 208. As disclosed in further detail herein, the housing 802 may include one or more sensors, such as a pressure sensor, to measure a pressure of a gas in the first lower leg 208. In this example, the housing 802 is coupled to an outer surface 808 of the first lower leg 208 near the port 806. The housing 802 may be coupled to the outer surface 808 via any mechanical and/or chemical fasteners (e.g., threaded fasteners such as a bolt, hook and loop fasteners, plastic cable ties, an adhesive pad, welding, etc.). In other examples, the housing 802 may be disposed in another location (e.g., mounted to a part of the frame 102 of the bicycle 100 (FIG. 1)).

Figure 10:
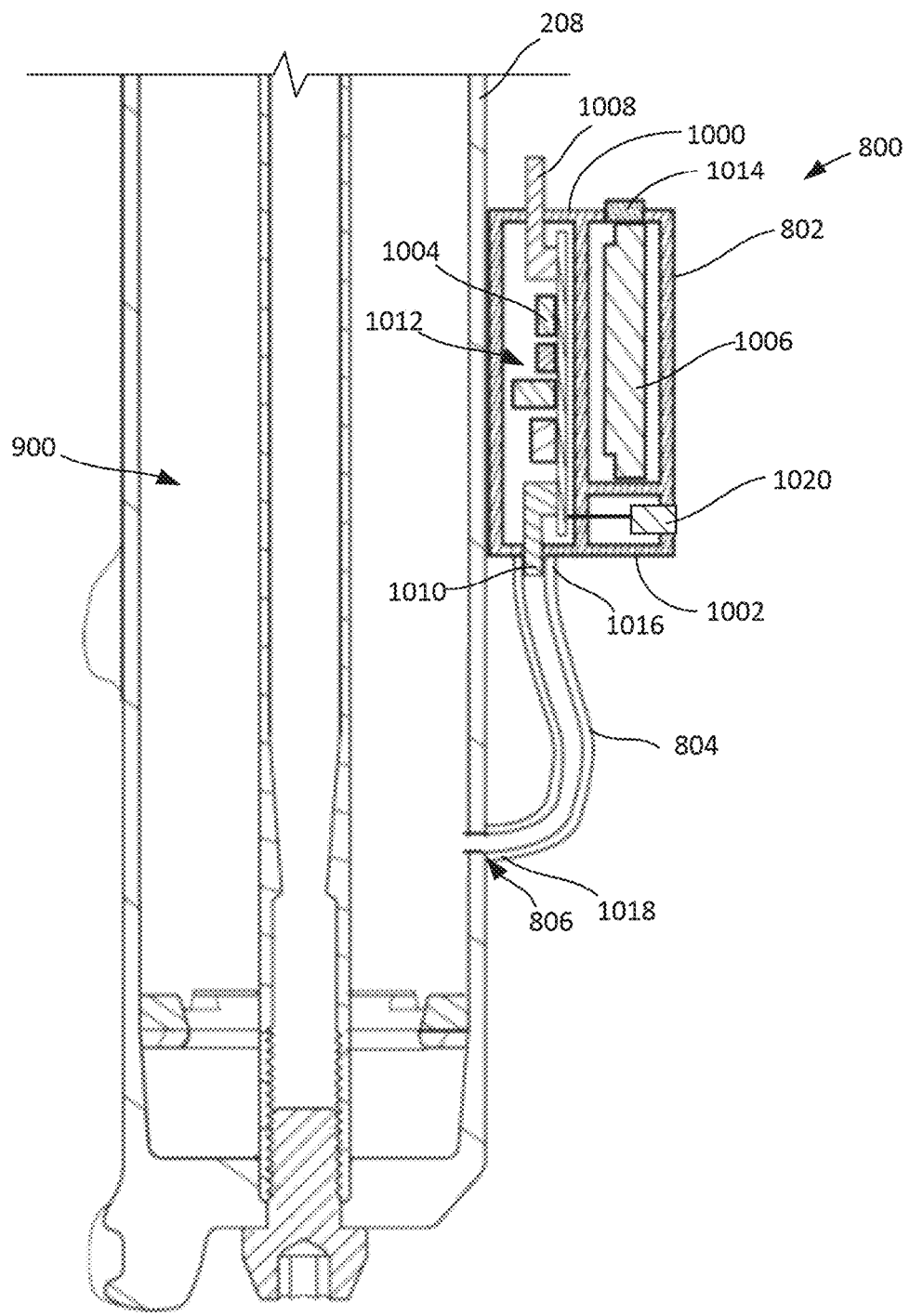
FIG. 10 is an enlarged view of the example SCA device of FIG. 8.

Also shown in FIG. 8 is an antenna 1008 and a door 1014 on the housing 802, which are disclosed in further detail in connection with FIG. 10. In some examples, the SCA device 800 includes a user interface, such as a light emitting diode (LED) 810, on the housing 802. The LED 810 may indicate a status (e.g., power-on) or other information of the SCA device 800 and/or enable a user to interact with the SCA device 800 (e.g., by pressing the LED 810 to turn the SCA device 800 on and off).

Figure 9:
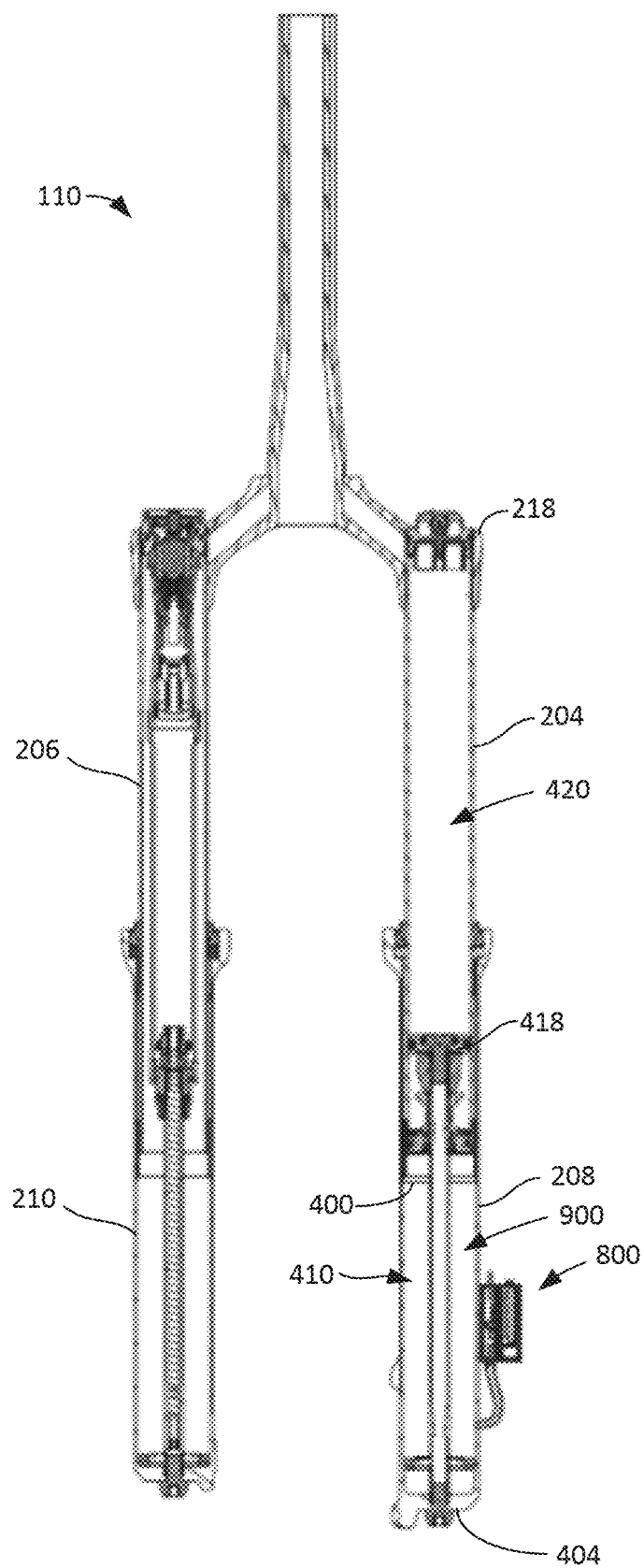
FIG. 9 is a cross-sectional view of the example front fork and SCA device of FIG. 8.

FIG. 9 is a cross-sectional view the front fork 110 and the SCA device 800 of FIG. 8. As shown in FIG. 9, a pneumatic chamber 900 (referred to herein as a second pressurized chamber 900) is formed in the interior space 410 of the first lower leg 208 between the bottom end 400 of the first upper leg 204 and the bottom end 404 of the first lower leg 208. In this example, the second pressurized chamber 900 is a residual air chamber that contains gas that is trapped during initial assembly of the upper legs 204, 206 and the lower legs 208, 210. The pressure of the gas in the second pressurized chamber 900 is less than the pressure in the pressurized chamber 420 formed between the top end 218 of the first upper leg 204 and the piston 418. During extension, the pressure of the gas in the second pressurized chamber 900 is relatively low or near ambient air pressure. During compression, the pressure in the second pressurized chamber 900 increases, but is still less than the pressure in the pressurized chamber 420. The second pressurized chamber 900 provides added return force for extending the front fork 110 after compression.

Similar to the examples disclosed above, the pressure of the gas in the second pressurized chamber 900 can be measured to determine one or more characteristics of the front fork 110. Measuring the gas pressure in the second pressurized chamber 900 enables the use of a metal coil compression spring instead of the pressurized chamber 420, for example.

FIG. 10 is an enlarged view of the SCA device 800 coupled to the first lower leg 208. The housing 802 includes a first end 1000 (e.g., a top end) and a second end 1002 (e.g., a bottom end) opposite the first end 1000. Similar to the SCA device 220 disclosed above, the SCA device 800 includes a PCB 1004, a battery 1006, an antenna 1008, and a pressure sensor 1010. The PCB 1004, the battery 1006, the antenna 1008, and the pressure sensor 1010 operate substantially the same as the PCB 528, the battery 540, the antenna 536, and the pressure sensor 532, respectively, disclosed above in connection with the SCA device 220 in FIG. 5. Thus, to avoid redundancy, a description of these components and their operations are not disclosed in detail again in connection with FIG. 10.

In the illustrated example of FIG. 10, the PCB 1004 and the battery 1006 are disposed within a cavity 1012 (or separate cavities) formed by the housing 802. The cavity 1012 may be isolated from the outside air. In other examples, the cavity 1012 may be in fluid communication with the outside air. Similar to the SCA device 220 disclosed above, the SCA device 800 includes a door 1014 that may be opened or removed to enable installation/removal of the battery 1006.

In the illustrated example, the antenna 1008 is coupled to the PCB 1004 and extends (through an opening) from the first end 1000 of the housing 802. As disclosed above, in some instances, disposing the antenna 1008 outside of the housing 802 helps to decrease interference with the wireless signals. In other examples, the antenna 1008 may extend from another side or surface of the housing 802. In still other examples, the entire antenna 1008 may be disposed completely within the housing 802.

In the illustrated example, the pressure sensor 1010 is coupled to the PCB 1004 and extends (through an opening) from the second end 1002 of the housing 802. To fluidly couple the pressure sensor 1010 and the gas in the second pressurized chamber 900, a first end 1016 of the hose 804 is coupled to the second end 1002 of the housing 802 around the pressure sensor 1010, and a second end 1018 of the hose 804 is coupled to the port 806 in the first lower leg 208. The hose 804 routes the pressurized gas in the second pressurized chamber 900 to the pressure sensor 1010. The pressure sensor 1010 measures the pressure of the gas in the second pressurized chamber 900 as the front fork 110 compresses and expands. In some examples, the port 806 may include a valve or other means of closing the port 806 (e.g., a screw cap). Thus, when the SCA device 800 is detached from the front fork 110 and/or otherwise not being used, the port 806 may be plugged to prevent release of the gas from the second pressurized chamber 900.

In other examples, the pressure sensor 1010 may not extend from a side of the housing 802. Instead, the pressure sensor 1010 may be entirely disposed within the cavity 1012 of the housing 802, and the hose 804 may route the pressurized gas into the cavity 1012 such that the pressure sensor 1010 can measure the pressure of the pressurized gas. In another example, the housing 802 can be coupled to the first lower leg 208 over the port 806, and the pressure sensor 1010 extends from the housing 802 directly into the port 806 and/or is otherwise in fluid communication with the pressurized chamber 900 without use of the hose 804.

In some examples, the SCA device 800 includes a second pressure sensor 1020 to detect an ambient pneumatic pressure around the front fork 110. The second pressure sensor 1020 provides signals indicative of the ambient pressure to the PCB 1004, which may process (e.g., interpret) the signals to determine the ambient pressure. The ambient pressure values may be transmitted, via the antenna 1008, to another device, such as the mobile device 138 for collection, further analysis, and/or display.

While in the illustrated example the SCA device 800 is disposed external to the first lower leg 208, in other examples, one or more components of the SCA device 800 may be internal to the first lower leg 208. For example, the pressure sensor 1010 may be disposed inside of the first lower leg 208 and may be electrically coupled to the housing 802 external to the first lower leg 208. In such an example, the pressure sensor 1010 is disposed within the second pressurized chamber 900. In still other examples, the SCA device 800 may be located entirely within the first lower leg 208.

In some examples, an SCA device including a pressure sensor may be configured for the measurement of a negative air (or low pressure) volume or chamber of a suspension component. For example, a negative air chamber may be used instead of a positive air chamber to determine displacement of the suspension component. In contrast to the positive air chamber, pressure in the negative air chamber is at a maximum when the suspension component is at full extension, and the pressure in the negative air chamber is at a minimum when the suspension component is at full compression. If the suspension component is a suspension fork, for example, an air shaft may be used to access the negative air chamber from outside the negative air chamber. One way this is accomplished is to allow the volume of air inside the air shaft to be part of the negative air chamber. Access to this combined negative air chamber is through a valve or port located at the lower end of the air shaft.

Figure 11:
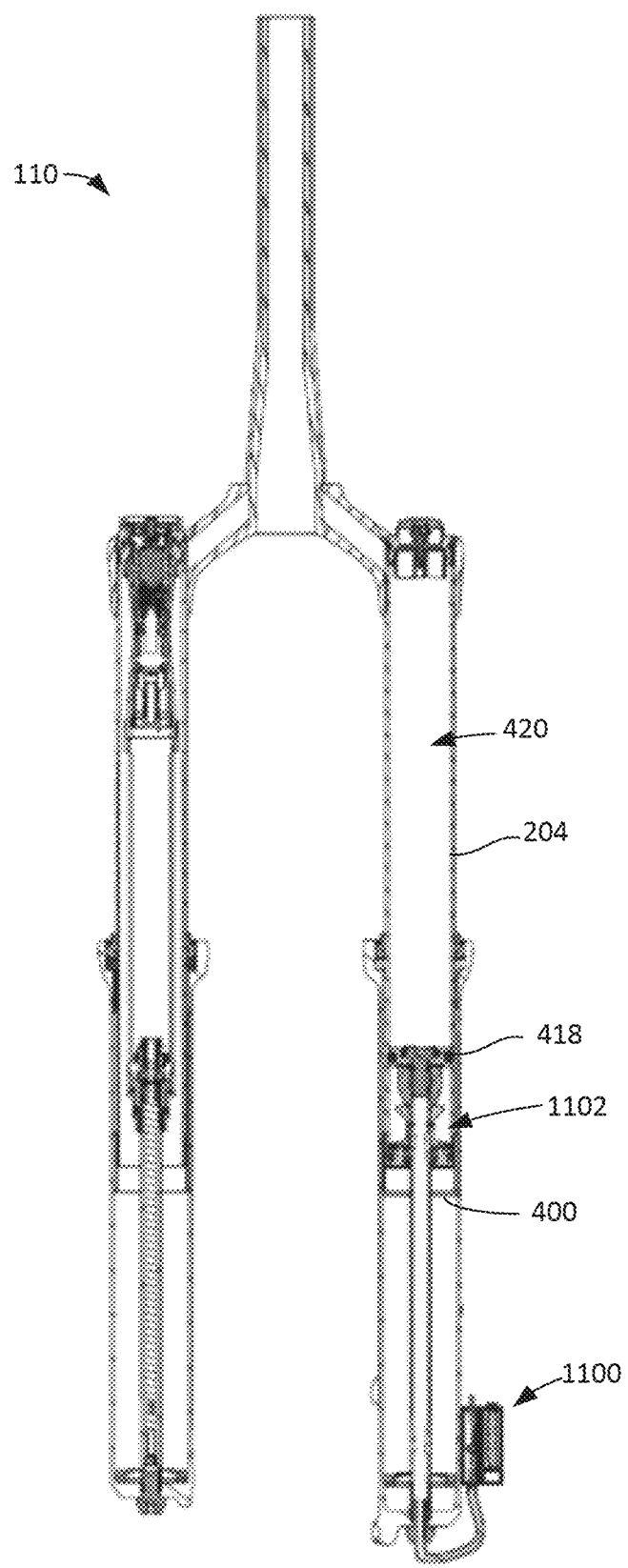
FIG. 11 is a cross-sectional view of the example front fork of the bicycle of FIG. 1 and another SCA device that may be implemented with the front fork.
Figure 12:
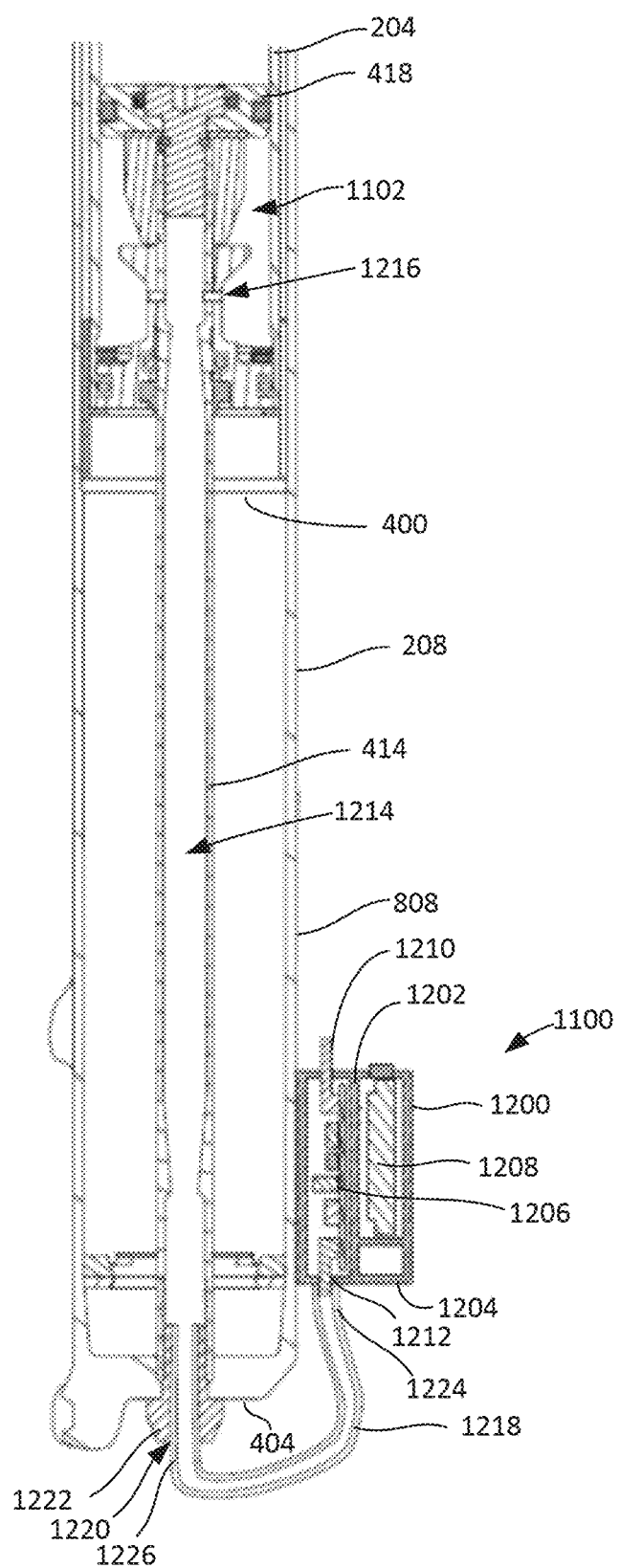
FIG. 12 is an enlarged view of the example SCA device of FIG. 11.

For example, FIGS. 11 and 12 illustrate another example SCA device 1100 that can be implemented in connection with the front fork 110. The SCA device 1100 of FIGS. 11 and 12 may correspond to the SCA device 134 of FIG. 1, for example. The SCA device 1100 can be used determine one or more characteristics (e.g., linear displacement) of the front fork 110 by measuring the pressure of a gas in a negative air chamber 1102, which is a pneumatic chamber of the front fork 110. The negative air chamber 1102 is formed between the piston 418 and the bottom end 400 of the first upper leg 204. The operation of the negative air chamber 1102 is opposite that of the pressurized chamber 420. In particular, when the front fork 110 is at full extension (the position shown in FIG. 11), the volume of the negative air chamber 1102 is at a minimum and, thus, the pressure of the gas in the negative air chamber 1102 is at a maximum. However, when the front fork 110 is at full compression (when the bottom end 400 of the first upper leg 204 is moved toward the bottom end 404 of the first lower leg 208), the volume of the negative air chamber 1102 is at a maximum and, thus, the pressure of the gas in the negative air chamber 1102 is at a minimum. The SCA device 1100 measures the changes in pressure in the negative air chamber 1102, which can be used to determine one or more characteristics of the front fork 110.

As shown more clearly in FIG. 12, the SCA device 1100 includes a housing 1200 having a first end 1202 and a second end 1204 opposite the first end 1202, a PCB 1206, a battery 1208, an antenna 1210, and a pressure sensor 1212. The SCA device 1100 is substantially the same as the SCA device 800 of FIGS. 8-10. Thus, to avoid redundancy, a description of the SCA device 1100 and its components and operations are not repeated herein. Instead, the interested reader is directed to the description of the SCA device 800.

In the illustrated example, the SCA device 1100 is fluidly coupled to the negative air chamber 1102 through the stem 414. In particular, the stem 414 may be an air shaft having a hollow center 1214. One or more ports 1216 are formed in the section of the stem 414 disposed in the negative air chamber 1102. Therefore, the hollow center 1214 of the stem 414 is filled with the gas from the negative air chamber 1102 and, thus, is at the same pressure as the negative air chamber 1102. In the illustrated example, a hose 1218 connects the SCA device 1100 to a port 1220 formed in a bolt 1222 in the bottom end 404 of the first lower leg 208. In particular, a first end 1224 of the hose 1218 is coupled to the second end 1204 around the pressure sensor 1212, and a second end 1226 of the hose 1218 is coupled to the port 1220 leading into the hollow center 1214 of the stem 414. As such, the pressure sensor 1212 is in fluid communication with the gas in the hollow center 1214 and, thus, is in fluid communication with the gas in the negative air chamber 1102. In other examples, the SCA device 1100 may be fluidly coupled to the negative air chamber 1102 in other manners.

In the illustrated example, the housing 1200 is coupled to the outer surface 808 of the first lower leg 208 near the bottom end 404. The housing 1200 may be coupled to the outer surface 808 via any mechanical and/or chemical fasteners (e.g., threaded fasteners such as a bolt, hook and loop fasteners, plastic cable ties, an adhesive pad, welding, etc.). In other examples, the housing 1200 may be disposed in another location (e.g., mounted to a part of the frame 102 of the bicycle 100 (FIG. 1)).

While in the illustrated examples of FIGS. 2-12 the SCA devices are implemented in connection with the front fork 110, example SCA devices can likewise be implemented in connection with other suspension components, such as an air shock can (e.g., a rear suspension element). For example, an SCA device, or a sensor thereof, may be attached to, and/or connected directly to, an air shock. The connection may be independent of a gas fill valve of the shock. Such a configuration enables the pressure to be changed without removing the SCA device, or a sensor thereof, from the air shock. Such a configuration also enables the gas fill port and the sensor gas port to be optimized for two separate purposes. The gas fill valve may be used to pressurize both the positive and negative chambers and, thus, may be placed at a location near both chambers.

Figure 13:
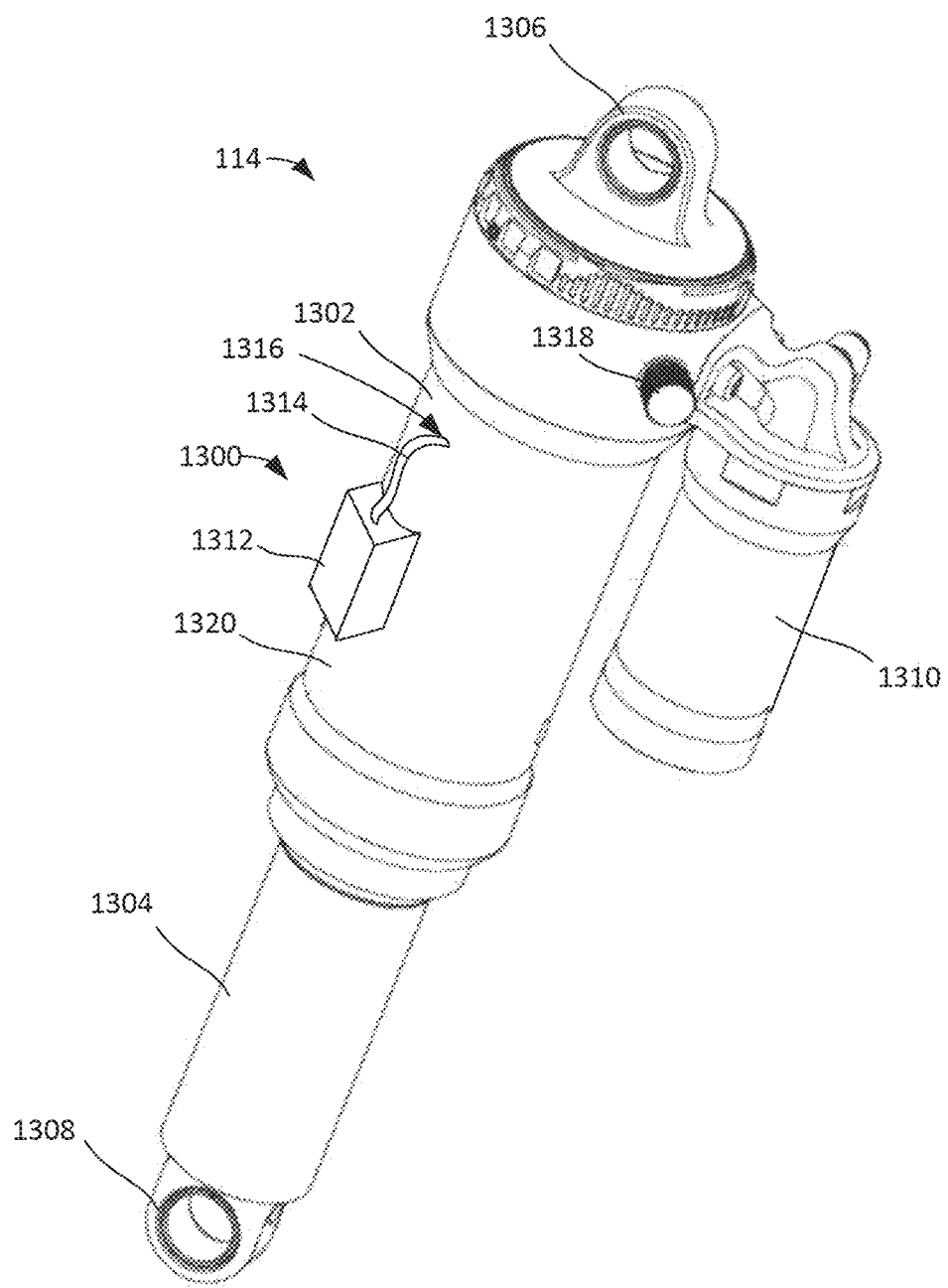
FIG. 13 is a perspective view of an example rear shock (a suspension component) of the bicycle of FIG. 1 and an example SCA device that may be implemented with the rear shock.

For example, FIG. 13 illustrates an example SCA device 1300 that may be implemented in connection with the rear shock 114. The SCA device 1300 of FIG. 13 may correspond to the SCA device 136 of FIG. 1, for example. Similar to the SCA devices disclosed above in connection with the front fork 110, the SCA device 1300 may be used to measure one or more variables or characteristics of the rear shock 114 to determine movement and/or position of the rear shock 114.

In the illustrated example, the rear shock 114 includes a first tube, such as an air can 1302, and a second tube, such as a damper body 1304, configured in a telescopic arrangement. The air can 1302 and the damper body 1304 include respective first and second attachment portions 1306, 1308 at distal ends for connecting between two components of a bicycle, such as the frame 102 and a swing arm connected to the rear wheel 112 of the bicycle 100 (FIG. 1). The damper body 1304 moves into and out of the air can 1302 to absorb vibrations. In this example, the rear shock 114 also includes a reservoir 1310 (sometimes referred to as a shock can or shock piggy-back can), which may be used to house excess damper fluid as the rear shock 114 compresses and/or extends. However, in other examples, the rear shock 114 may not include a separate reservoir.

In the illustrated example, the SCA device 1300 includes a housing 1312 that is fluidly coupled via a hose 1314 to a port 1316 in the air can 1302. As disclosed in further detail below, the housing 1312 may include one or more sensors, such as a pressure sensor, to measure a pressure of a gas in the air can 1302. The port 1316 is separate from a gas fill port 1318 of the rear shock 114. As such, use of the SCA device 1300 does not interfere with the ability to fill or release gas from the rear shock 114.

In this example, the housing 1312 is coupled to an outer surface 1320 of the air can 1302 near the port 1316. The housing 1312 may be coupled to the outer surface 1320 via any mechanical and/or chemical fasteners (e.g., threaded fasteners such as a bolt, hook and loop fasteners, plastic cable ties, an adhesive pad, welding, etc.). In other examples, the housing 1312 may be disposed in other locations.

Figure 14:
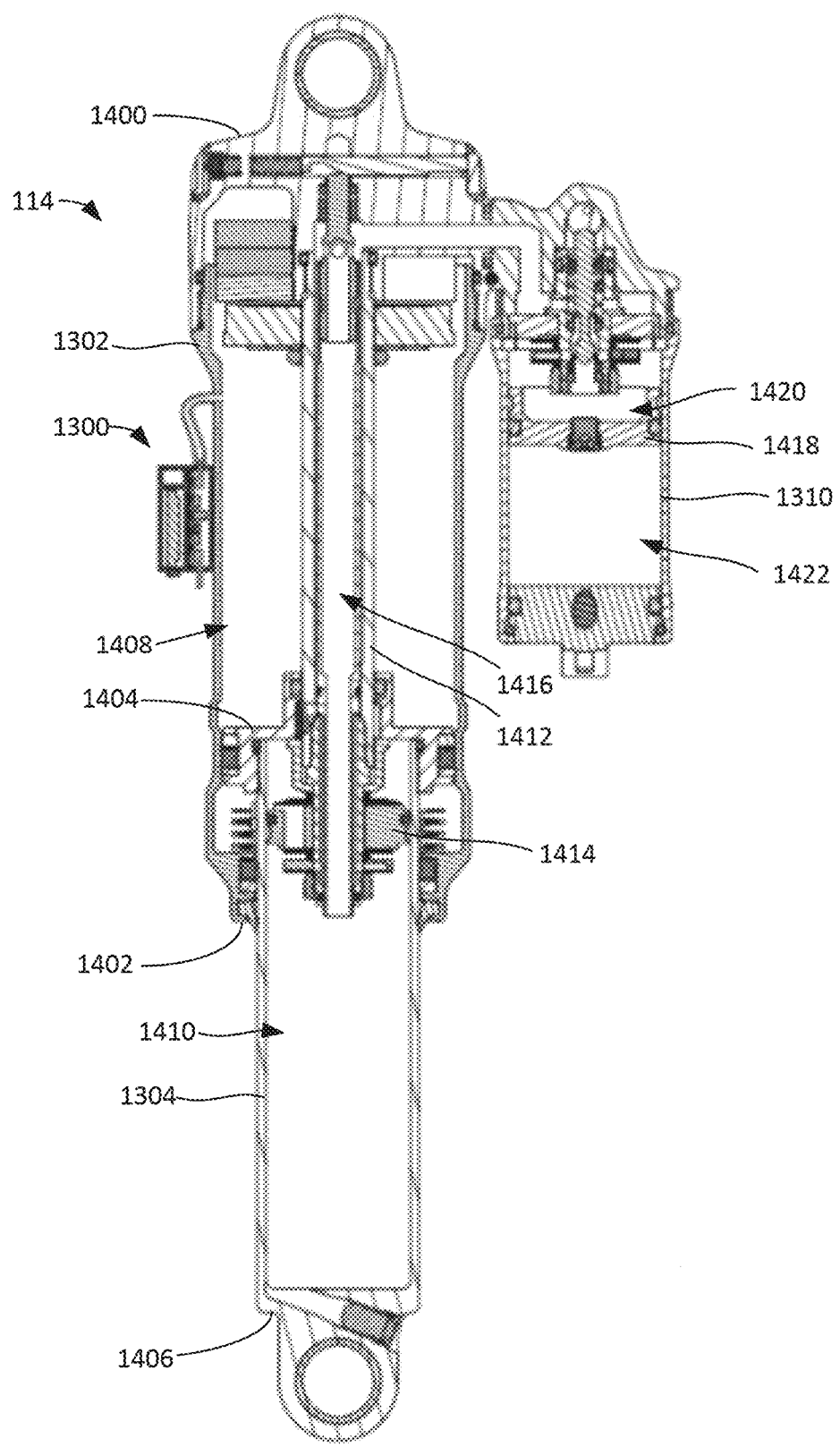
FIG. 14 is a cross-sectional view of the example rear shock and SCA device of FIG. 13.

FIG. 14 is a cross-sectional view of the rear shock 114 and the SCA device 1300. In the illustrated example, the air can 1302 includes a first end 1400 (e.g., a top end) and a second end 1402 (e.g., a bottom end) opposite the first end 1400. Similarly, the damper body 1304 includes a first end 1404 and a second end 1406 opposite the first end 1404. In the illustrated example, a pneumatic chamber 1408 is formed in the air can 1302 between the first end 1400 of the air can 1302 and the first end 1404 of the damper body 1304. The pneumatic chamber 1408 is filled with compressed gas, such as air. Thus, the pneumatic chamber 1408 is a pressurized chamber 1408 (sometimes referred to as a high pressurized air zone or positive spring chamber). When the rear shock 114 is compressed (when the second end 1406 of the damper body 1304 moves toward the first end 1400 of the air can 1302), the volume of the pressurized chamber 1408 decreases and, thus, the pressure of the gas in the pressurized chamber 1408 increases. When the rear shock 114 is extended (when the second end 1406 of the damper body 1304 moves away from the first end 1400 of the air can 1302), the volume of the pressurized chamber 1408 increases and, thus, the pressure of the gas in the pressurized chamber 1408 decreases. The compressed gas acts as a spring to absorb vibrations and also to return the rear shock 114 to the extended state (the state shown in FIG. 14).

In some examples, an internal cavity 1410 of the damper body 1304 includes a damper fluid, such as oil. In the illustrated example, the rear shock 114 includes a stem 1412 that extends from the first end 1400 of the air can 1302, through the first end 1404 of the damper body 1304, and into the internal cavity 1410 of the damper body 1304. A piston 1414 is coupled to the stem 1412 and slides in the internal cavity 1410 of the damper body 1304 as the rear shock 114 compresses and extends. For example, when the rear shock 114 compresses, a piston at the first end 1404 of the damper body 1304 moves into the pressurized chamber 1408, thus causing the second end 1406 of the damper body 1304 to move toward the piston 1414, which decreases the volume in the internal cavity 1410. As a result, the oil in the internal cavity 1410 is pushed up through a passageway 1416 in the stem 1412 and into the reservoir 1310.

The reservoir 1310 includes a floating piston 1418 that separates the reservoir 1310 into a first portion 1420 (e.g., a top portion) and a second portion 1422 (e.g., a bottom portion). The floating piston 1418 moves up and down in the reservoir 1310 based on the pressure differential across the piston 1418. The oil is routed into the first portion 1420 of the reservoir 1310. The second portion 1422 (which is another pneumatic chamber) may be filled with a compressed gas. The compressed gas in the second portion 1422 may have a higher pressure or a lower pressure than the compressed gas in the pressurized chamber 1408 depending on the design of the rear shock 114. As the oil is pushed into the first portion 1420, the piston 1418 is pushed downward, thereby decreasing the volume of the second portion 1422 and compressing the gas in the second portion 1422. When the rear shock 114 is extending, the volume of the internal cavity 1410 in the damper body 1304 increases and the oil flows back into the internal cavity 1410. The compressed gas in the second portion 1422 of the reservoir 1310 pushes against the piston 1418, thereby pushing the oil from the first portion 1420 back into the internal cavity 1410 and helping the rear shock 114 to expand.

Figure 15:
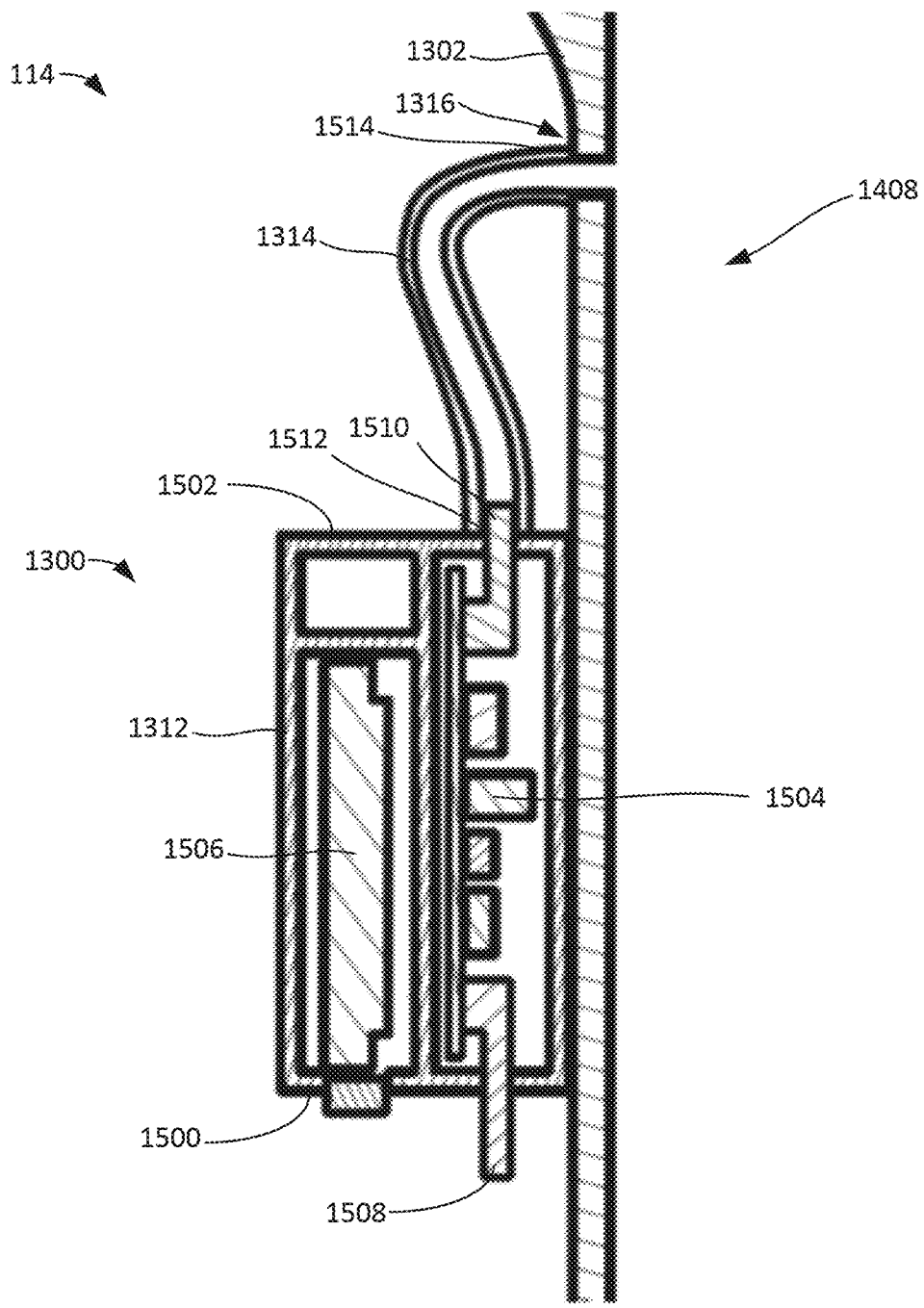
FIG. 15 is an enlarged view of the example SCA device of FIG. 14.

FIG. 15 is an enlarged view of the SCA device 1300 coupled to the air can 1302. In the illustrated example, the SCA device 1300 includes the housing 1312 having a first end 1500 and a second end 1502 opposite the first end 1500, a PCB 1504, a battery 1506, an antenna 1508, and a pressure sensor 1510. The SCA device 1300 is substantially the same as the SCA devices 800, 1100 of FIGS. 8-12 disclosed above. Thus, to avoid redundancy, a description of the SCA device 1300 and its component(s) and operation(s) are not repeated herein. Instead, the interested reader is directed to the description of the SCA devices 800, 1100.

In the illustrated example, a first end 1512 of the hose 1314 is coupled to the second end 1502 of the housing 1312 around the pressure sensor 1510, and a second end 1514 of the hose 1314 is coupled to the port 1316 in the air can 1302. The hose 1314 routes the compressed gas in the second pressurized chamber 1408 to the pressure sensor 1510. The pressure sensor 1510 measures the pressure of the gas in the second pressurized chamber 1408 as rear shock 114 compresses and expands. In some examples, the port 1316 may include a valve or other means of closing the port 1316 (e.g., a screw cap). Thus, when the SCA device 1300 is detached from the rear shock 114 and/or otherwise not being used, the port 1316 may be plugged to prevent release of the gas from the pressurized chamber 1408.

In other examples, the pressure sensor 1510 may not extend from a side of the housing 1312. Instead, the pressure sensor 1510 may disposed entirely within a cavity of the housing 1312, and the hose 1314 may route the pressurized gas into the cavity so that the pressure sensor 1510 can measure the pressure of the compressed gas. In another example, the housing 1312 can be coupled to the air can 1302 over the port 1316, and the pressure sensor 1510 may extend from the housing 1312 and into the port 1316 and/or otherwise be in fluid communication with the pressurized chamber 1408 without the hose 1314

In other examples, one or more components of the SCA device 1300 may be internal to the suspension component. For example, the pressure sensor 1510 may be disposed inside of the air can 1302, while the housing 1312 and other electronics remain external to the air can 1302. The pressure sensor 1510 may be communicatively coupled to the PCB 1504 via one or more wires extending through the body of the air can 1302. In another example, the entire housing 1312 may be disposed inside of the air can 1302 (and in the pressurized chamber 1408, similar to the SCA device 220 disclosed above).

Figure 16:
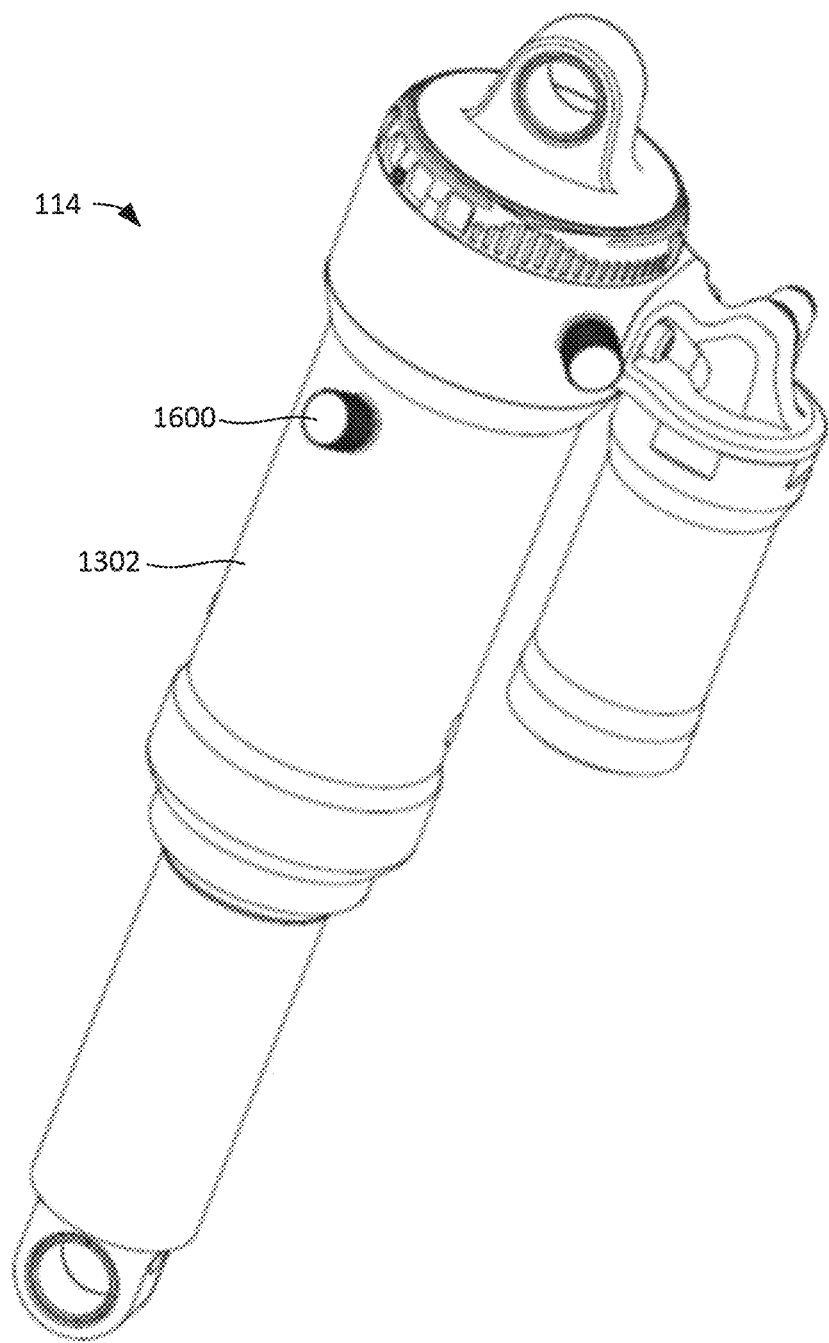
FIG. 16 is a perspective view of the rear shock of FIG. 13 showing an example port on the rear shock that may be used for connecting the example SCA device to the rear shock.

In some examples, a designated port with a valve may be provided on the suspension component for connecting the SCA device. For example, as shown in FIG. 16, the rear shock 114 may include a port 1600 (which may correspond to the port 1316) on the air can 1302. The port 1600 may include a valve that can be opened or closed. When an SCA device is connected to the port 1600, the valve can be opened to fluidly couple the SCA device and the inside of the pressurized chamber 1408 (FIG. 14). However, when an SCA device is not being used, the valve can be closed, which prevents the compressed gas from escaping the pressurized chamber 1408.

While in the illustrated example of FIG. 13 the SCA device 1300 measures the pressure in the pressurized chamber 1408 of the rear shock 114, in other examples, an SCA device, and/or a sensor thereof, may be configured to measure the pressure of another gas or fluid in another chamber of the rear shock 114. For example, an SCA device may be mounted to a shock piggy-back can or reservoir. Some bicycle suspension components, such as rear shocks, have what are known as piggy back reservoirs to manage damping fluid of the component. The piggy back provides a place for the damping fluid to go when the shock has been actuated. An internal floating piston ("IFP") is used to keep the air and oil separate in the piggyback. A valve is used to pressurize the gas side of the IFP. This pressurized IFP chamber in the piggyback may be separately ported to the SCA device to read IFP pressure.

Figure 17:
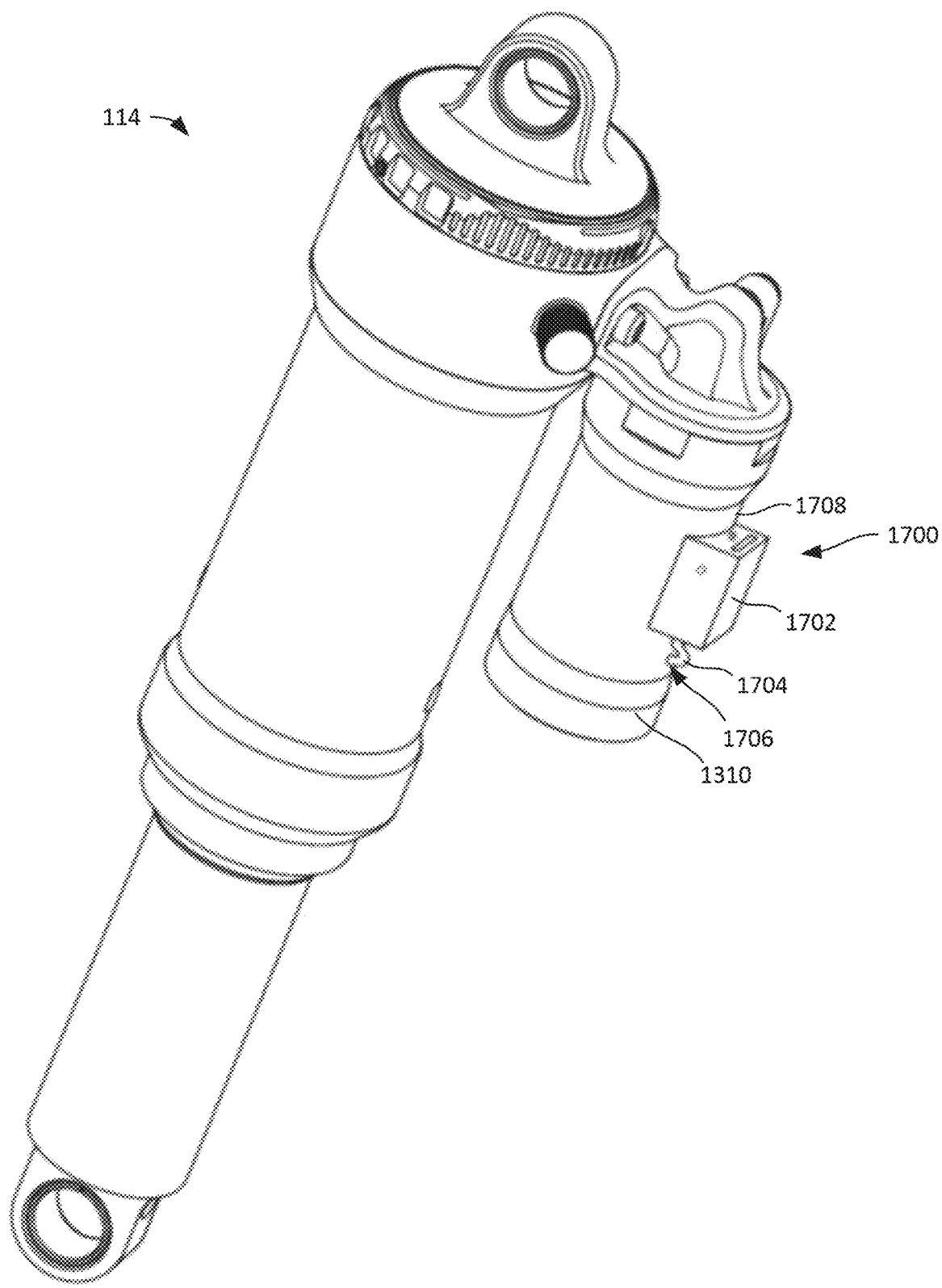
FIG. 17 is a perspective view of the example rear shock of the bicycle of FIG. 1 and another example SCA device that may be implemented with the rear shock.

For example, FIG. 17 shows another example SCA device 1700 that may be implemented in connection with the rear shock 114. The SCA device 1700 of FIG. 17 may correspond to the SCA device 136 of FIG. 1, for example. Similar to the SCA devices disclosed above, the SCA device 1700 may be used to measure one or more variables or characteristics of the rear shock 114 to determine movement and/or position of the rear shock 114.

The SCA device 1700 includes a housing 1702. The housing 1702 is fluidly coupled via a hose 1704 to a port 1706 in the reservoir 1310. In this example, the housing 1702 is coupled to an outer surface 1708 of the reservoir 1310 near the port 1706. The housing 1702 may be coupled to the outer surface 1708 via any mechanical and/or chemical fasteners (e.g., threaded fasteners such as a bolt, hook and loop fasteners, plastic cable ties, an adhesive pad, welding, etc.). In other examples, the housing 1702 may be disposed in other locations.

Figure 18:
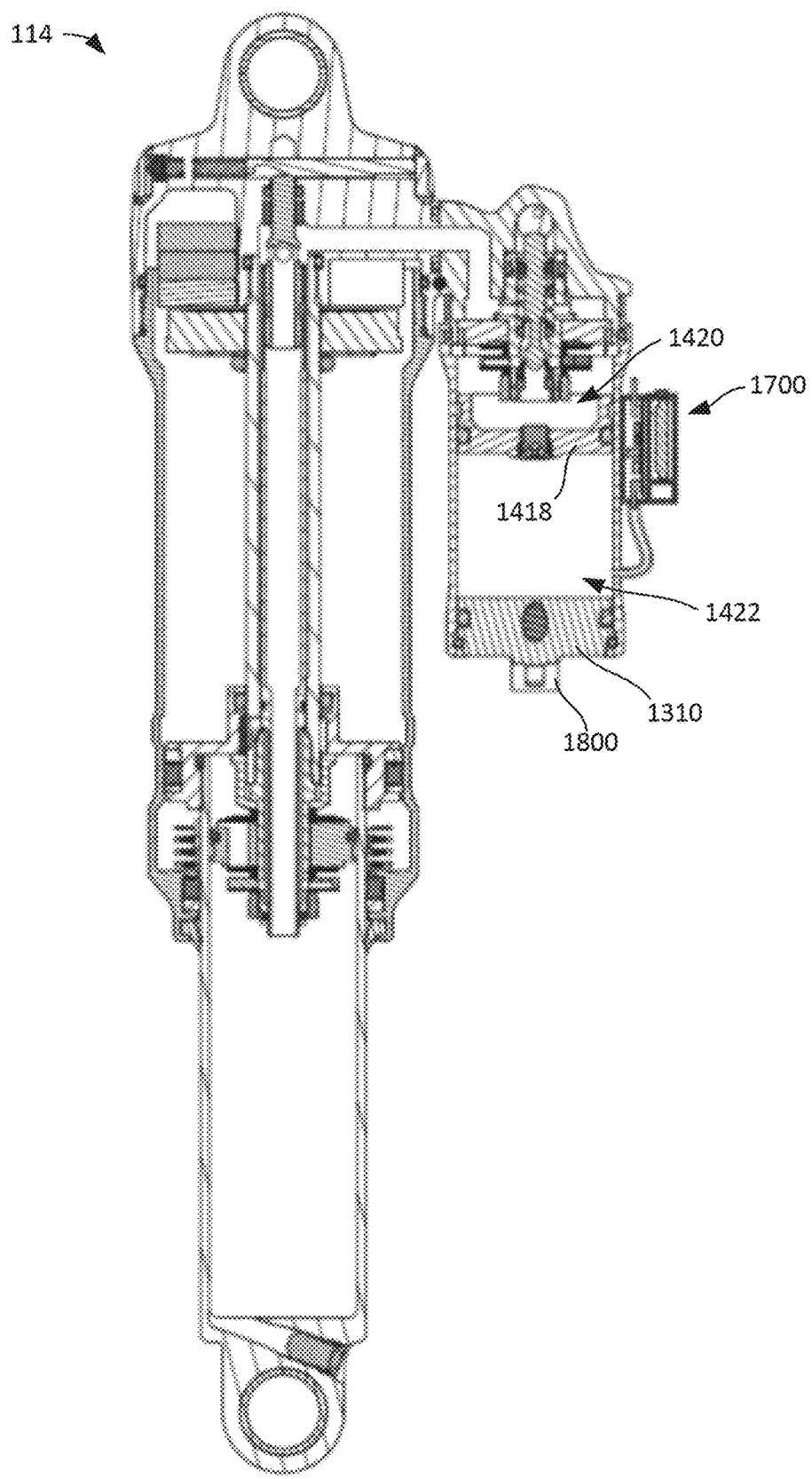
FIG. 18 is a cross-sectional view of the example rear shock and SCA device of FIG. 17.

FIG. 18 is a cross-sectional view of the rear shock 114 and the SCA device 1700. As disclosed above, the reservoir 1310 includes the floating piston 1418 that separates the reservoir 1310 into the first portion 1420 and the second portion 1422. The first portion 1420 contains oil and the second portion 1422 contains a compressed gas. The compressed gas may be filled via a valve 1800 in the reservoir 1310. The floating piston 1418 moves up and down in the reservoir 1310 based on the pressure differential across the piston 1418. In this example, the SCA device 1700 is in fluid communication with the compressed gas in the second portion 1422. When the rear shock 114 is compressed, the pressure in the second portion 1422 is at a maximum, and when the rear shock 114 is fully extended, the pressure in the second portion 1422 is at a minimum.

Figure 19:
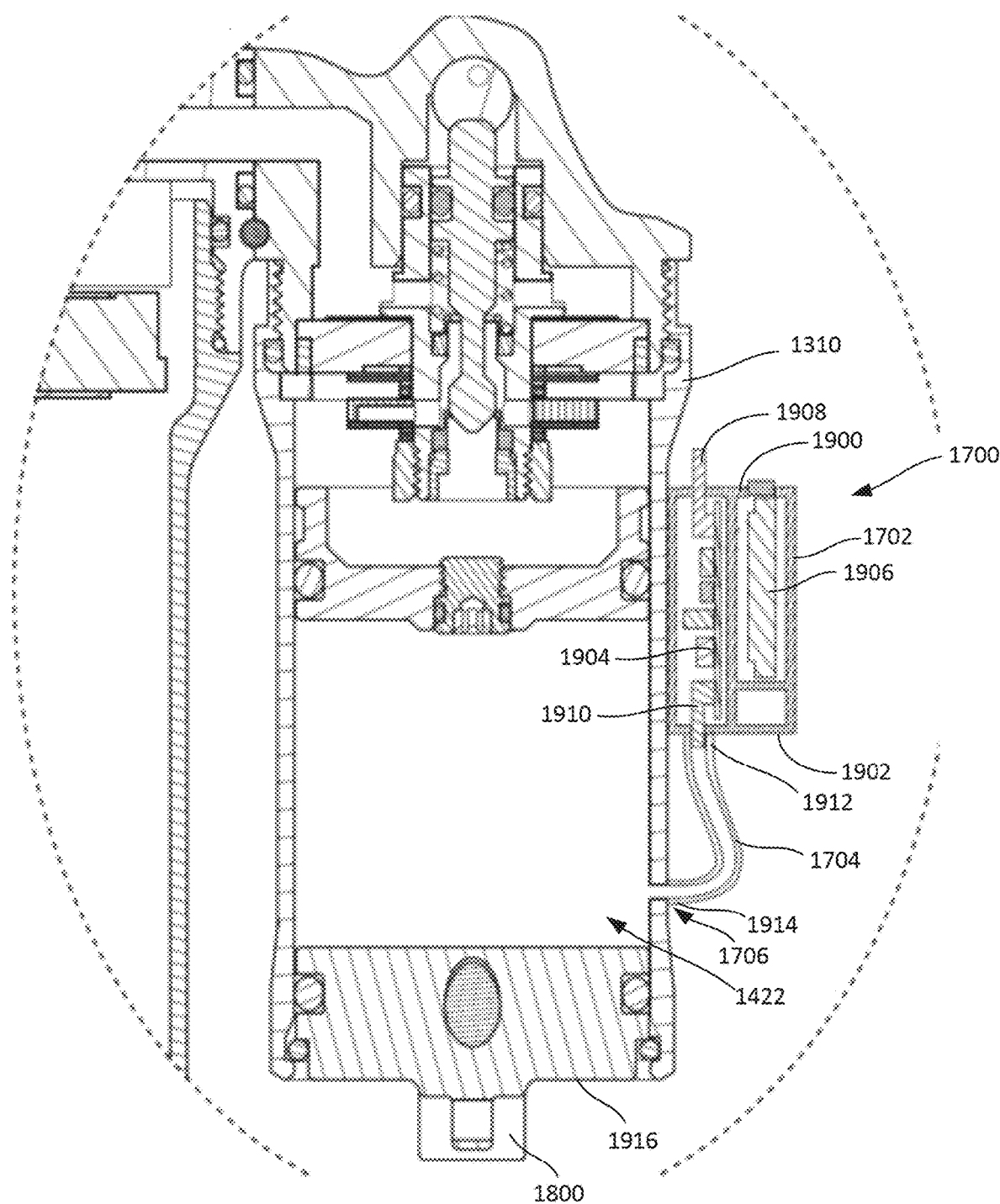
FIG. 19 is an enlarged view of the example SCA device of FIG. 14.

FIG. 19 is an enlarged view of the SCA device 1700 coupled to the reservoir 1310. In the illustrated example, the SCA device 1700 includes the housing 1702 having a first end 1900 and a second end 1902 opposite the first end 1900, a PCB 1904, a battery 1906, an antenna 1908, and a pressure sensor 1910. The SCA device 1700 is substantially the same as the SCA devices 800, 1100, 1300 of FIGS. 8-15 disclosed above. Thus, to avoid redundancy, a description of the SCA device 1700 and its component(s) and operation(s) are not repeated herein. Instead, the interested reader is directed to the description of the SCA devices 800, 1100, 1300.

In the illustrated example, a first end 1912 of the hose 1704 is coupled to the second end 1902 of the housing 1702 around the pressure sensor 1910, and a second end 1914 of the hose 1704 is coupled to the port 1706 in the reservoir 1310. The hose 1704 routes the compressed gas in the second portion 1422 to the pressure sensor 1910. The pressure sensor 1910 measures the pressure of the gas in the second portion 1422 as rear shock 114 compresses and expands.

In other examples, the pressure sensor 1910 may not extend from a side of the housing 1702. Instead, the pressure sensor 1910 may be disposed entirely within a cavity of the housing 1702, and the hose 1704 may route the pressurized gas into the cavity so that the pressure sensor 1910 can measure the pressure of the compressed gas. In another example, the housing 1702 may be coupled to the reservoir 1310 over the port 1706, and the pressure sensor 1910 may extend from the housing 1702 directly into the port 1706 and/or otherwise be in fluid communication with the second portion 1422 without the use of the hose 1704.

While in the illustrated example the SCA device 1700 is fluidly coupled to the second portion 1422 of the reservoir 1310 through a side-wall, in other examples, the SCA device 1700 may be in-line/coaxial with the reservoir 1310. For example, the SCA device 1700 may be coupled to a bottom end 1916 of the reservoir 1310, such that the SCA device 1700 is substantially aligned with a central axis of the reservoir 1310. In some examples, the SCA device 1700 is fluidly coupled to the second portion 1422 through the valve 1800.

In other examples, one or more components of the SCA device 1700 may be internal and/otherwise integral with the suspension component. For example, the pressure sensor 1910 may be disposed inside of the second portion 1422 of the reservoir 1310, while the housing 1702 and other electronics remain external to the reservoir 1310. The pressure sensor 1910 may be communicatively coupled to the PCB 1904 via one or more wires extending through the body of the reservoir 1310. In another example, the entire housing 1702 may be disposed inside of the reservoir 1310 (and disposed in the compressed gas in the second portion 1422, similar to the SCA device 220 disclosed above).

While in some of the examples disclosed above pressure is measured directly with a pressure sensor, in other examples, an SCA device may be used to measure different characteristics of a suspension component, such as mechanical strain of a suspension component. For example, an SCA device that measures strain may be attached to the outside of a pressure container to determine internal gas pressure based on the expansion or contraction of the pressure container due to the internal gas pressure.

Figure 20:
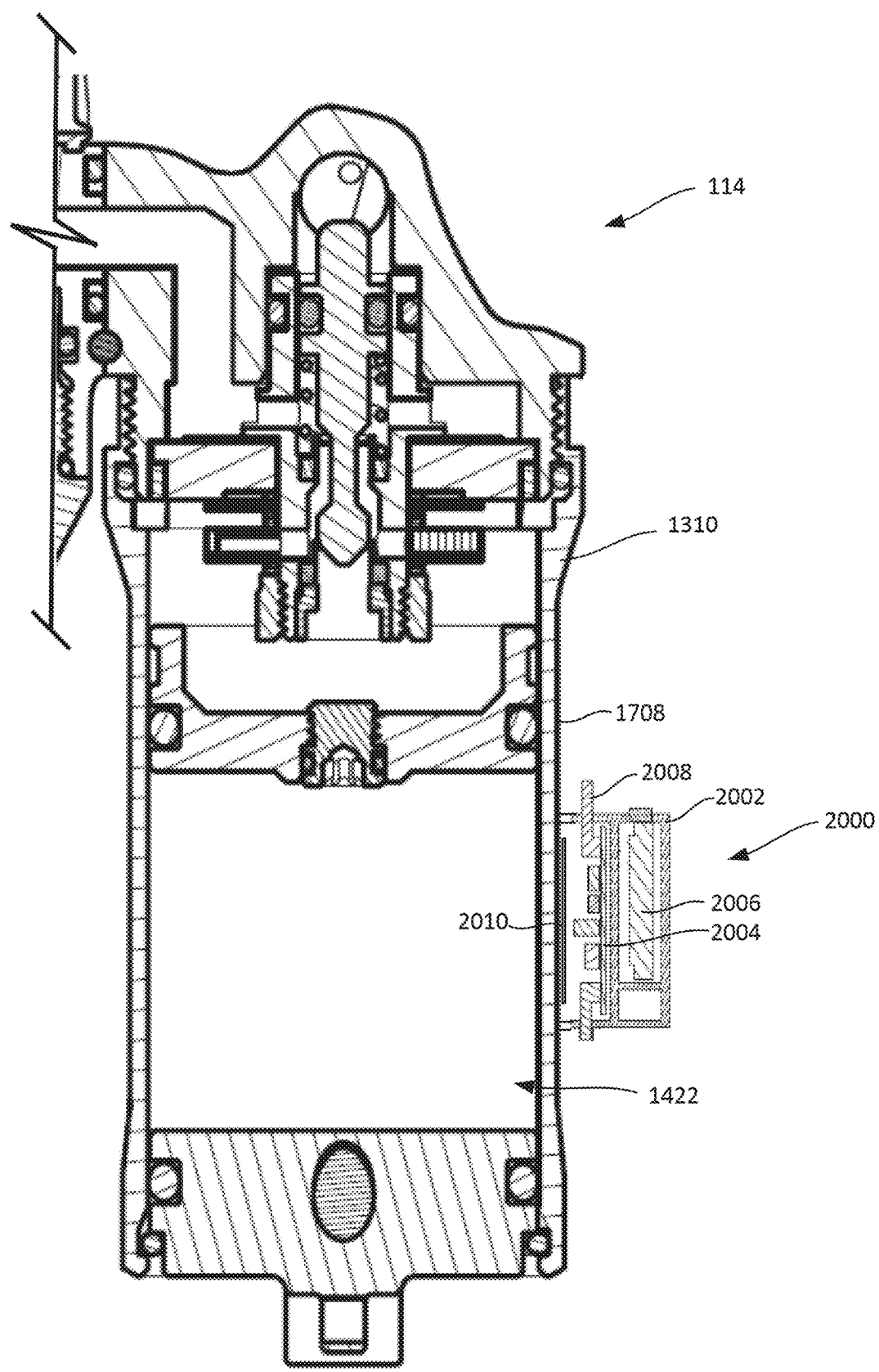
FIG. 20 is a cross-sectional view of the example rear shock of the bicycle of FIG. 1 and another SCA device that may be implemented with the rear shock.

For example, FIG. 20 is a cross-sectional view of another example SCA device 2000 that may be implemented in connection with a suspension component. In this example, the SCA device 2000 is implemented in connection with the rear shock 114. The SCA device 2000 may correspond to the SCA device 136 of FIG. 1, for example. The SCA device 2000 may be used to measure stress and/or strain on the outer surface 1708 of the reservoir 1310.

The SCA device 2000 is similar to the other SCA devices disclosed herein and includes a housing 2002, a PCB 2004, a battery 2006, and an antenna 2008. In the illustrated example, the housing 2002 is coupled to the outer surface 1708 of the reservoir 1310 can near the second portion 1422. In this example, the SCA device 2000 includes one or more sensors, such as gage(s) 2010, that is/are disposed on the outer surface 1708 of the reservoir 1310. The gage(s) 2010 may include one or more strain gages that can measure hoop and/or longitudinal strain occurring on the outer surface of the reservoir 1310. The gage(s) 2010 are communicatively coupled to the PCB 2004 which may include circuitry for interpreting and/or communicating the signals provided by the gage measurements. Additionally or alternatively, the gage(s) 2010 may include one or more linear gages that measure strain in linear and/or hoop direction of the reservoir 1310. The gage(s) 2010 is/are electrically coupled to the circuitry of the PCB 2004, which may measure the electrical resistance change(s) in the gage(s) 2010. The electrical resistance change(s) is/are proportional to a strain value of the material of the reservoir 1310. This strain can be related to the pressure within the reservoir 1310 and, thus, can be correlated to linear movement (compression/expansion) of the rear shock 114. The circuitry of the PCB 2004 may be configured to compute these strain values and transmit any data via a wireless communication interface (e.g., via the antenna 2008).

In another example, the displacement of parts of the suspension component are measured. For example, an SCA device may be used to directly measure the displacement of parts relative to each other through contact or by using non-contact measuring techniques. For example, a mechanical contact apparatus may be used as a sensor by an SCA device to identify the relative movement between suspension components. The mechanism may be inside or outside of a pressure boundary. In other examples, a non-contact sensor may be employed. For example, a Hall Effect or other similar sensor may be used by an SCA device to identify the relative movement between suspension system parts or components.

Figure 21:
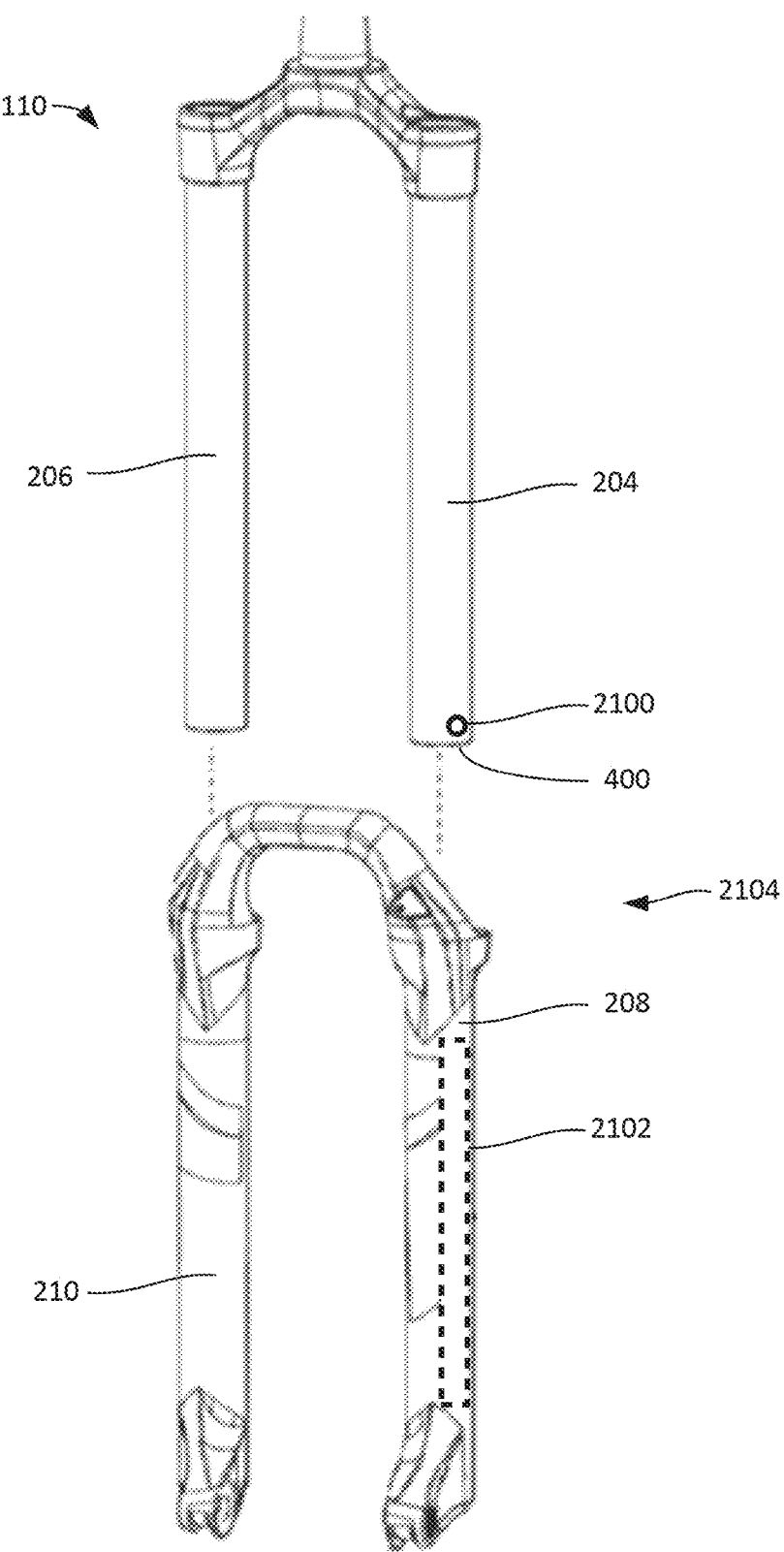
FIG. 21 is a partially exploded view of the front fork of the bicycle of FIG. 1 and another SCA device that may be implemented with the front fork.

For example, FIG. 21 shows the example front fork 110. In this example, a magnet 2100 is coupled to the first upper leg 204 near the bottom end 400 of the first upper leg 204. In other examples, the magnet 2100 may be disposed in another location on the first upper leg 204. One or more sensors 2102 of an SCA device is/are coupled to and disposed along the length of the first lower leg 208. The sensor(s) 2102 can be disposed inside or outside of the pressure boundary. The magnet 2100 and the sensor(s) 2102 form an SCA device 2104, which may also include a PCB, a power supply (e.g., a battery), a wireless communication interface, etc. The sensor(s) 2102 measure(s) the location of the magnet 2100 along the length of the first lower leg 208. Thus, the sensor(s) 2102 can be used to determine the displacement of the upper legs 204, 206 relative to the lower legs 208, 210. In other examples, the locations of the magnet 2100 and the sensor(s) 2102 may be reversed. In another example, one sensor may be employed on one leg, and a plurality of magnets may be disposed along a length of the other leg. The sensor may sense the movement and/or position of the magnets to determine the displacement of the other leg.

In other examples, optical techniques may be used by an SCA device to measure the relative displacement. Laser reflection, optical scales, or other markings may be applied to a suspension component or part using various techniques to identify relative movement between the parts. Optical sensors of an SCA device may be configured and/or disposed within the suspension component or external to the suspension component to read the markings and/or the movements thereof. Such optical sensors may be inside or outside of pressure boundary.

Figure 22:
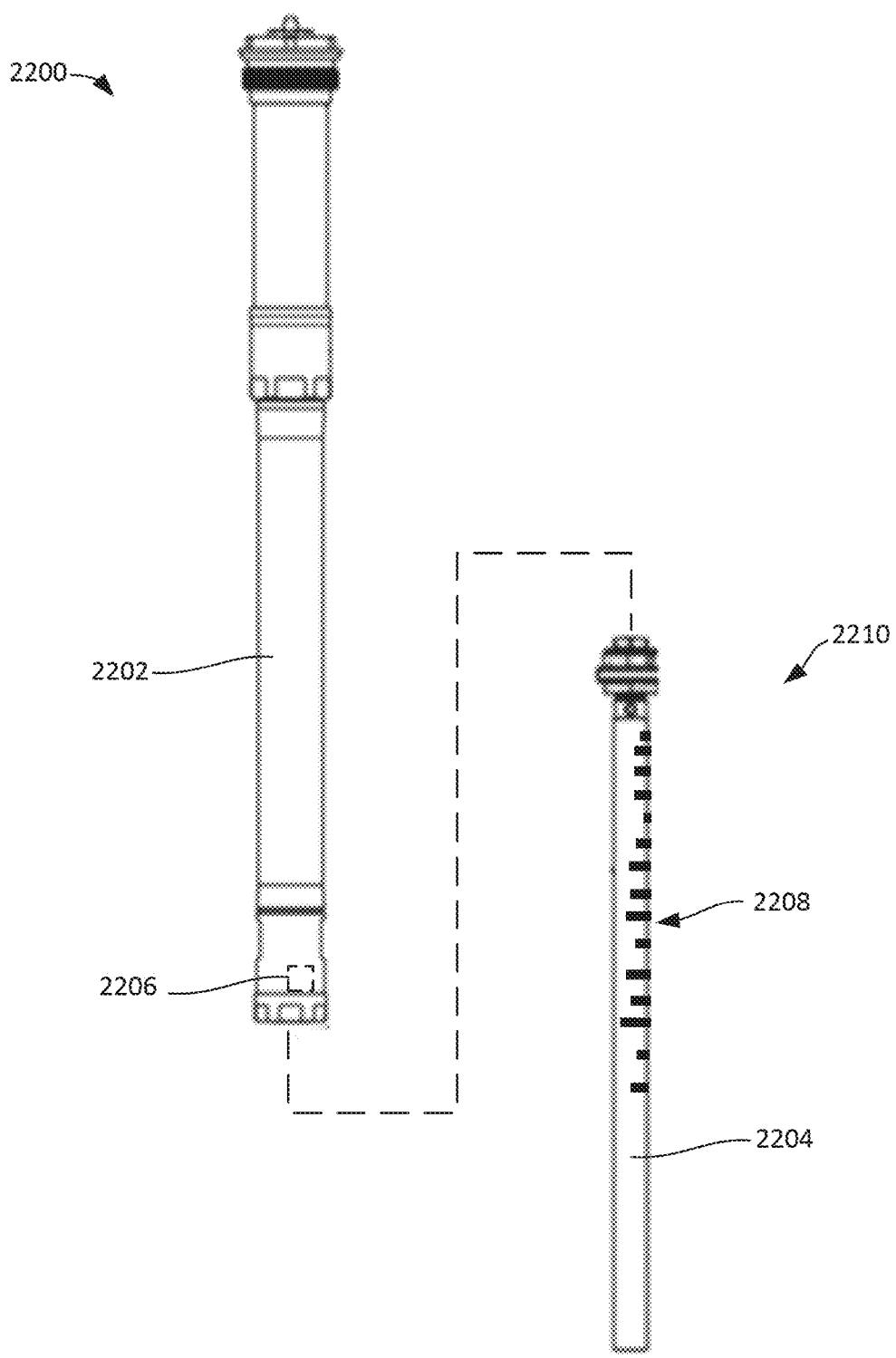
FIG. 22 illustrates an exploded view of two tubes that may form part of a suspension component on the bicycle of FIG. 1 and another SCA device that may be implemented with the tubes.

For example, FIG. 22 is an exploded view of an example suspension component 2200, such as a damper or a spring system, including a first tube 2202 and a second tube 2204. The first and second tube 2202, 2204 may correspond to any two parts of any of the example suspension components disclosed herein. The second tube 2204 is slidable within the first tube 2202 in a telescopic arrangement. In the illustrated example, an optical sensor 2206 of an SCA device is coupled to the first tube 2202 near a bottom end. The optical sensor 2206 may be disposed outside or inside of the first tube 2202 (e.g., inside or outside of a pressure boundary). The second tube 2204 includes a plurality of laser etchings 2208 along a length of the second tube 2204. The laser etchings 2208 are codes that are measurable by the optical sensor 2206. The optical sensor 2206 measures the laser etchings 2208 to determine the relative position of the first and second tubes 2202, 2204. The optical sensor 2206 and the etchings 2208 form an SCA device 2210, which may also include a PCB, a power supply (e.g., a battery), a wireless communication interface, etc.

The use of a suspension measurement device, such as an SCA device, can be even more valuable when combined with many other sensors for making and predicting suspension recommendations. Below are examples in which information from one or more SCA devices may be combined with other types of sensors to improve the performance of a bicycle.

For example, an SCA device (e.g., any of the SCA devices 134, 136, 220, 700, 800, 1100, 1300, 1700, 2000, 2104, 2210 disclosed herein) may be used in combination with a coasting sensor. A coasting sensor looks at the relationship of the rear wheel rotational speed versus the cassette rotational speed. When these two speeds differ, there is coasting. When an SCA device is paired with a coasting sensor, it enables the SCA device to more accurately define rider interaction such as pedaling when determining events for characterization by the SCA device.

In another example, an SCA device (e.g., any of the SCA devices 134, 136, 220, 700, 800, 1100, 1300, 1700, 2000, 2104, 2210 disclosed herein) may be used in combination with a pedal/cadence sensor. A pedal sensor can determine not only if a rider is pedaling, but also the rate at which the rider is pedaling. This information in combination with an SCA enables the SCA to accurately define certain events such as pedaling bob and even link the frequency of suspension bob to pedaling rate.

In another example, an SCA device (e.g., any of the SCA devices 134, 136, 220, 700, 800, 1100, 1300, 1700, 2000, 2104, 2210 disclosed herein) may be used in combination with a seat post position sensor. Adjustable height seat posts are relatively new and are becoming more common. An electronic adjustable seat post or sensor thereof may indicate the position of the seat that the rider has chosen. The knowledge of this seat post position in combination with an SCA can help refine and categorize event detection. A seat post in the down position can indicate the rider is standing, which can aid in characterizing the suspension performance.

In another example, an SCA device (e.g., any of the SCA devices 134, 136, 220, 700, 800, 1100, 1300, 1700, 2000, 2104, 2210 disclosed herein) may be used in combination with a power meter. A power meter measures how much power or torque a rider imparts to the bicycle. When a power meter is used with an SCA, events can be characterized with greater accuracy because the power meter determines exactly when the rider is pedaling and how hard the rider is pedaling. High power events can be characterized differently than events with similar pedal frequency but lower power.

In another example, an SCA device (e.g., any of the SCA devices 134, 136, 220, 700, 800, 1100, 1300, 1700, 2000, 2104, 2210 disclosed herein) may be used in combination a global positioning system (GPS) device. When used in conjunction with a GPS device, an SCA can have the ability to track and store tuning settings or events directly for sections of trail or geographic terrain types. The locations of the SCAs can be used to build a predictive tuning logic via which a rider can input where they are planning to ride and, if the riding location is a new location, and the rider may be provided a recommendation on how to change their suspension based on a database of other user's information and trends for tuning to that geographic area associated with the new location. Tuning detail can also be refined so tuning becomes specific to a portion of the trail or area instead of putting the entire ride session in one category. The device can learn that when the rider is riding up hill, to tune towards efficiency; or when the rider is descending, the device can look for more suspension travel and tune for preserving speed of the bike instead of pedaling efficiency. Online trail database integration can be accomplished using segment profiling related to suspension tuning and integration with social networking.

In another example, an SCA device (e.g., any of the SCA devices 134, 136, 220, 700, 800, 1100, 1300, 1700, 2000, 2104, 2210 disclosed herein) may be used in combination with a speed sensor. A speed sensor is used to determine the speed at which the bicycle/rider is traveling. When a speed sensor is used with an SCA, this information can help characterize event detection by the SCA. Suspension events measured by the SCA can be refined by the speed of the bicycle for which the event happened. Low bike speed events that see a high velocity compression event can indicate something like a drop where a high-speed event with high velocity compression event may simply be a large rock taken at high speed.

In another example, an SCA device (e.g., any of the SCA devices 134, 136, 220, 700, 800, 1100, 1300, 1700, 2000, 2104, 2210 disclosed herein) may be used in combination with a tire pressure sensor. A tire pressure sensor is used to monitor the real-time pressure of a tire. When this information is used in with an SCA, the SCA can make recommendations based on the information the tire sensor is reporting. When events are measured by the SCA, the tire pressures can also be recorded to help gain a better understanding of the whole system as tires can change the terrain input on the suspension system. Tires that are over/under inflated can have a large effect on the performance of a suspension system.

In another example, an SCA device (e.g., any of the SCA devices 134, 136, 220, 700, 800, 1100, 1300, 1700, 2000, 2104, 2210 disclosed herein) may be used in combination with a gear indicator device. When a gear indicator device is used with an SCA, additional information can be gained to help determine tuning events such as bob. Judgement can also be made about the bicycle/rider speed based on gear selected.

In another example, an SCA device (e.g., any of the SCA devices 134, 136, 220, 700, 800, 1100, 1300, 1700, 2000, 2104, 2210 disclosed herein) may be used in combination with a frame strain sensor. In other words, a device that collects strain or flex data from the bicycle can be used in conjunction with an SCA to give additional information about bicycle behavior by examining the way a suspension system influences the bicycle frame or geometry. This information can be used for design development or ride enhancement.

In another example, an SCA device (e.g., any of the SCA devices 134, 136, 220, 700, 800, 1100, 1300, 1700, 2000, 2104, 2210 disclosed herein) may be used in combination with a suspension controller. An electronic suspension controller utilizes its own logic to control different tuning aspects of a bicycle's suspension. When used in conjunction with an SCA, both devices can benefit greatly. The suspension controller has more detailed data about how the suspension is performing over certain terrain and helps make more detailed tuning adjustments. Likewise, the SCA has detailed information about the state of the suspension system such as damper settings to better make distinctions for tuning desires and events. The SCA can tune the component(s) for high efficiency mode if the SCA knows that the suspension system dampers are more closed to counteract events like pedal bob or fast compression; and on the other hand tune for an aggressive/playful mode if all the dampers are more open to encourage more suspension travel.

Figure 23:
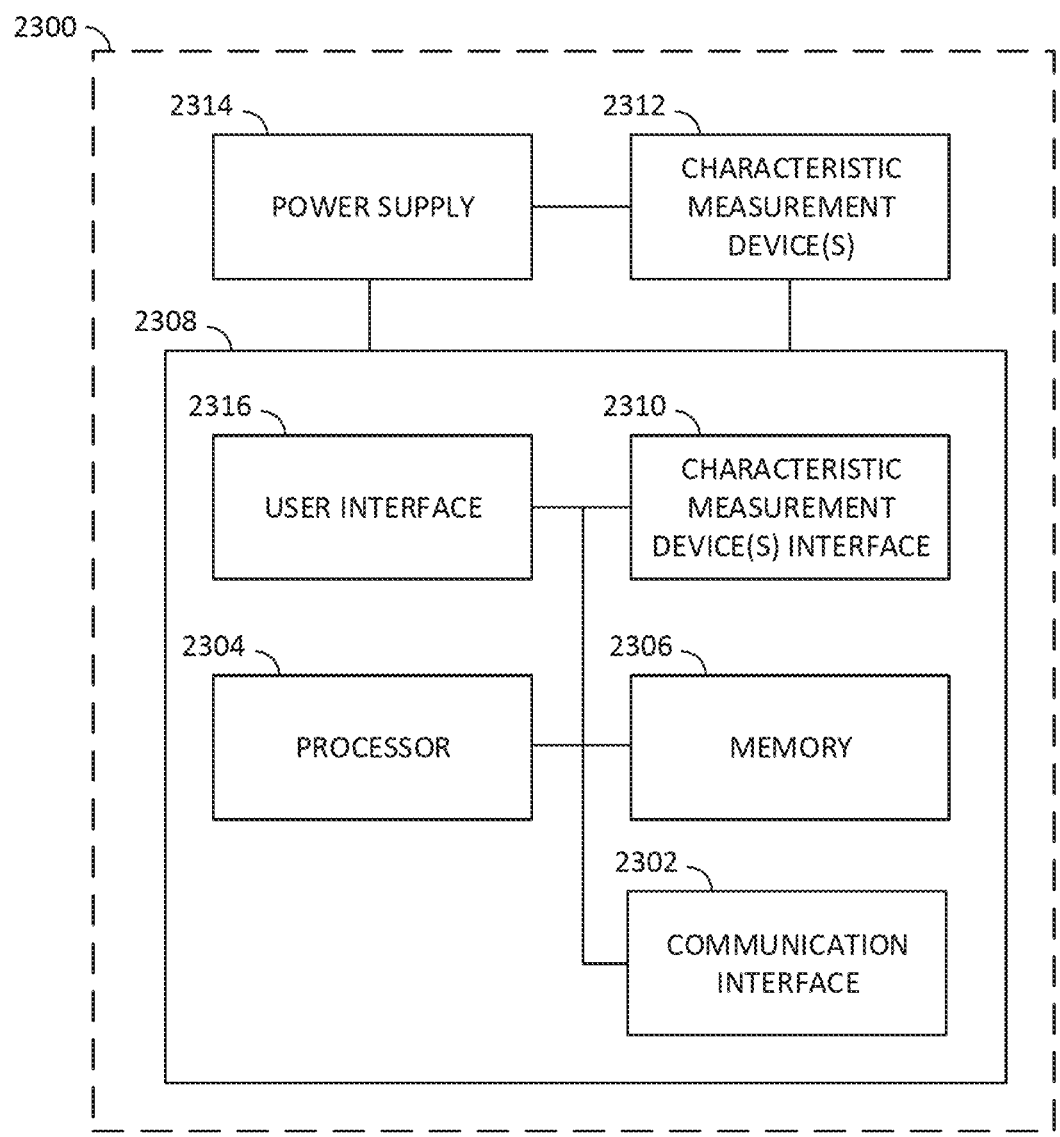
FIG. 23 is a block diagram of an example SCA device that may be implemented as any of the example SCA devices disclosed herein.

FIG. 23 is a block diagram of an example SCA device 2300. The example SCA device 2300 may be implemented as any of the example SCA devices 134, 136, 220, 700, 800, 1100, 1300, 1700, 2000, 2104, 2210 disclosed herein. The SCA device 2300 includes a communication interface 2302, processor 2304, memory 2306, as well as possibly other components, which may be implemented using circuitry and with one or more PCBs 2308 that may be used to implement examples disclosed herein. The PCB 2308 may correspond to any of the example PCBs disclosed herein in connection with the SCA devices 134, 136, 220, 700, 800, 1100, 1300, 1700, 2000, 2104, 2210. The circuitry may include the processor 2304, the memory 2306, and/or the communication interface 2302 such as radio electronics operable to transmit and/or receive radio signals. Additional, different, or fewer components are possible. For example, the PCB 2308 may include a characteristic measurement device interface 2310.

The SCA device 2300 also includes one or more suspension characteristic measurement device(s) 2312, such as a sensor, configured for measuring a characteristic of a suspensions component. The suspension characteristic measurement device(s) 2312 may correspond to any of the example sensors disclosed in connection with the SCA devices 134, 136, 220, 700, 800, 1100, 1300, 1700, 2000, 2104, 2210.

In the illustrated example, the SCA device 2300 also includes a power supply 2314 configured to power circuitry of the PCB 2308 and/or other components of the SCA device 2300, such as the suspension characteristic measurement device(s) 2312. The power supply 2314 may correspond to any of the batteries disclosed in connection with the SCA devices 134, 136, 220, 700, 800, 1100, 1300, 1700, 2000, 2104, 2210. The SCA device 2300, or the PCB 2308 thereof, may include a user interface 2316, such as a light emitting diode ("LED"), a mechanical button, or other device, used for indicating a status or other information relating to the SCA device 2300, or otherwise interacting with the SCA device 2300.

The processor 2304 may include a general processor, digital signal processor, an application specific integrated circuit ("ASIC"), field programmable gate array ("FPGA"), analog circuit, digital circuit, combinations thereof, or other now known or later developed processor. The processor 2304 may be a single device or combinations of devices, such as through shared or parallel processing. In one embodiment, for example, the processor 2304 used may be an Atmel® ATmega324PA microcontroller with an internal eeprom memory.

The communication interface 2302 may be any communication interface operable to communicate data with a mobile device, such as the mobile device 138 (FIG. 1). The communication interface 2302 may be a wireless communication interface. For example, radio circuitry may be configured to communicate data, such as values or control signals, wirelessly between one or multiple bicycle components and/or mobile devices. The data may be communicated wirelessly using any technique, protocol, or standard. For example, Institute of Electrical and Electronics Engineers ("IEEE") 802.11 standards, IEEE 802.15.1 or BLUETOOTH® standards, ANT™ or ANT+™ standards, and/or SRAM AIREA™ standards may be used. In an embodiment, the radio circuitry may include a transmitter and receiver such as an Atmel® AT86RF231 2.4 GHz transceiver utilizing Advanced Encryption Standard ("AES") encryption and Direct-Sequence Spread ("DSS") spectrum technology supporting 16 channels and the IEEE 802.15.4 communication protocol.

The memory 2306 may be a volatile memory or a non-volatile memory. The memory 2306 may include one or more of a read only memory ("ROM"), random access memory ("RAM"), a flash memory, an electronic erasable program read only memory ("EEPROM"), or other type of memory. The memory 2306 may be removable from the SCA device 2300, such as a secure digital ("SD") memory card. In some examples, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 2306 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor (e.g., the processor 2304) or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 2314 is a portable power supply, which may be stored internal to the SCA device 2300 (e.g., within a housing of an SCA device). The power supply 2314 may involve the generation of electric power, for example using a mechanical power generator, a fuel cell device, photovoltaic cells, or other power generating devices. The power supply may include a battery such as a device consisting of two or more electrochemical cells that convert stored chemical energy into electrical energy. The power supply may include a combination of multiple batteries or other power providing devices. Specially fitted or configured battery types, or standard battery types such as CR 2012, CR 2016, and/or CR 2032 may be used.

Wireless communication between components and/or mobile devices is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as the PCB 2308. Further, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or an SCA device to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A suspension component for a bicycle, the suspension component comprising:
   a first tube and a second tube configured in a telescopic arrangement having an interior space;
   a spring system including a pneumatic chamber containing a mass of a gas forming a pneumatic spring configured to resist compression of the telescopic arrangement; and a suspension component analysis (SCA) device including:
   a pressure sensor to detect a pressure of the gas in the pneumatic chamber and provide a signal indicative of the detected pressure;
   circuitry configured to receive the signal, the circuitry and the pressure sensor at least partially disposed in the interior space, and
   a wireless communicator in communication with the circuitry, the wireless communicator to transmit a wireless signal representative of the detected pressure.

2. The suspension component of claim 1, wherein the circuitry and the pressure sensor are at least partially disposed in the pneumatic chamber.

3. The suspension component of claim 1, wherein the SCA device includes a housing, a printed circuit board (PCB) including the circuitry being disposed within the housing.

4. The suspension component of claim 3, wherein the housing is sealed to isolate the PCB from the pressure of the pneumatic chamber.

5. The suspension component of claim 4, wherein the pressure sensor extends through an opening in the housing to detect the pressure of the gas in the pneumatic chamber.

6. The suspension component of claim 1, wherein the SCA device includes a valve to control a flow of the gas into and/or out of the pneumatic chamber.

7. The suspension component of claim 6, wherein the SCA device includes a top cap, and wherein the valve is at least partially disposed in the top cap.

8. The suspension component of claim 1, wherein the wireless communicator includes an antenna operable to transmit signals representative of the detected pressure.

9. The suspension component of claim 8, wherein the SCA device includes a top cap, and the antenna is at least partially disposed in the top cap.

10. The suspension component of claim 1, wherein the SCA device includes a top cap to seal an end of one of the first or second tubes.

11. The suspension component of claim 10, wherein the SCA device includes a housing containing the circuitry, and wherein the housing is coupled to the top cap.

12. The suspension component of claim 10, wherein the top cap includes a threaded portion configured for threaded engagement with one of the first or second tubes.

13. A suspension component for a bicycle, the suspension component comprising:
   a first tube and a second tube configured in a telescopic arrangement having an interior space;
   a spring system including a pneumatic chamber containing a mass of a gas forming a pneumatic spring configured to resist compression of the telescopic arrangement; and
   a suspension component analysis (SCA) device including:
      a pressure sensor to detect a pressure of the gas in the pneumatic chamber and provide a signal indicative of the detected pressure; and
      circuitry configured to receive the signal, the circuitry and the pressure sensor at least partially disposed in the interior space,
   wherein the SCA device includes a power supply, and wherein the power supply is at least partially disposed in the interior space.

14. The suspension component of claim 13, wherein the SCA device includes a movable power supply cover that enables installation and/or removal of the power supply.

15. The suspension component of claim 1, wherein the SCA device includes a second pressure sensor to detect an ambient pneumatic pressure around the suspension component.

* * * * *